US00RE48507E

(19) United States
(12) Reissued Patent
Palladino et al.

(10) Patent Number: US RE48,507 E
(45) Date of Reissued Patent: Apr. 6, 2021

(54) SYSTEM AND METHOD FOR EXTENDING PROXY SERVER FUNCTIONALITY INTO API

(71) Applicant: KONG INC., San Francisco, CA (US)

(72) Inventors: Marco Palladino, San Francisco, CA (US); Augusto Marietti, San Francisco, CA (US); Michele Zonca, San Francisco, CA (US)

(73) Assignee: KONG, INC., San Francisco, CA (US)

(21) Appl. No.: 15/641,835

(22) Filed: Jul. 5, 2017

Related U.S. Patent Documents

Reissue of:
(64) Patent No.: 9,077,773
Issued: Jul. 7, 2015
Appl. No.: 13/680,277
Filed: Nov. 19, 2012

U.S. Applications:
(60) Provisional application No. 61/576,808, filed on Dec. 16, 2011, provisional application No. 61/561,220, filed on Nov. 17, 2011.

(51) Int. Cl.

| | |
|---|---|
| ***H04L 29/06*** | (2006.01) |
| ***G06F 8/30*** | (2018.01) |
| ***G06F 9/44*** | (2018.01) |
| ***G06F 9/54*** | (2006.01) |
| ***G06Q 50/00*** | (2012.01) |

(52) U.S. Cl.
CPC ..... *H04L 65/40* (2013.01); *G06F 8/30* (2013.01); *G06F 9/44* (2013.01); *G06F 9/541* (2013.01); *G06Q 50/01* (2013.01)

(58) Field of Classification Search
USPC ..... 709/223–229
See application file for complete search history.

(56) References Cited

U.S. PATENT DOCUMENTS 8,856,869 B1 * 10/2014 Brinskelle ..... H04L 63/08 726/12
9,027,039 B2 * 5/2015 Michels ..... G06F 9/54 719/328
9,077,773 B2 7/2015 Palladino et al.
9,367,595 B1 * 6/2016 Malks ..... G06F 17/30569
(Continued)

FOREIGN PATENT DOCUMENTS

WO 2008094540 A1 8/2008

OTHER PUBLICATIONS

Non-Final Office Action dated Oct. 20, 2014 of U.S. Appl. No. 13/680,277 by Palladino, M., et al., filed Nov. 19, 2012.
(Continued)

*Primary Examiner* — Peng Ke
(74) *Attorney, Agent, or Firm* — Perkins Coie LLP; Colin Fowler

(57) ABSTRACT

Systems and methods for facilitating distribution of application programming interfaces (APIs) in a social hub are described herein. The social API hub enables users (i.e., API consumers) to access (e.g., search, test, and/or otherwise utilize or consume) APIs that other users (i.e., API developers) submitted to the hub in a standardized manner. Additionally, users can wrap submitted APIs in a standard description format and add various add-ons on top of an existing API infrastructure in order to provide additional functionality.

76 Claims, 24 Drawing Sheets

(56) References Cited

U.S. PATENT DOCUMENTS

| | | | | |
|---|---|---|---|---|
| 2010/0011394 | A1* | 1/2010 | Lee | G06F 17/30864 725/40 |
| 2011/0231280 | A1* | 9/2011 | Farah | G06Q 10/10 705/26.8 |
| 2011/0238496 | A1* | 9/2011 | Gurbuxani et al. | 705/14.49 |
| 2013/0132584 | A1 | 5/2013 | Palladino et al. | |
| 2014/0129326 | A1* | 5/2014 | Munitz | 705/14.48 |
| 2015/0127565 | A1* | 5/2015 | Chevalier | G06Q 10/00 705/319 |

OTHER PUBLICATIONS

Notice of Allowance dated Mar. 5, 2015 of U.S. Appl. No. 13/680,277 by Palladino, M., et al., filed Nov. 19, 2012.

U.S. Appl. No. 13/680,277 by Palladino, M., et al., filed Nov. 19, 2012.

* cited by examiner

```
exports.interceptors = {
        onStart:function(context, callback) {
                log.info("Executing addon: onStart event triggered");
                callback();
        },
        onClose:function(context, callback) {
                log.info("Executing addon: onClose event triggered");
                callback();
        }
};
```

SYSTEM AND METHOD FOR EXTENDING PROXY SERVER FUNCTIONALITY INTO API

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a broadening reissue of U.S. Pat. No. 9,077,773, issued Jul. 7, 2015, which claims priority to U.S. Provisional Application No. 61/576,808, filed Dec. 16, 2011, and which claims priority to U.S. Provisional Application No. 61/561,220, filed Nov. 17, 2011, all of which are incorporated herein by reference in their entireties.*

CLAIM OF PRIORITY

This application claims priority to U.S. Provisional Patent Application No. 61/561,220 entitled "SYSTEMS AND METHODS FOR API MARKETPLACE," which was filed on Nov. 17, 2011, .and U.S. Provisional Patent Application No. 61/576,808 entitled "METHODS AND SYSTEMS FOR PROGRAMMABLE API PROXY," which was filed on Dec. 16, 2011, both of which are expressly incorporated by reference herein.

BACKGROUND

Application programming interfaces (APIs) are specifications intended to be used as interfaces by software components to communicate with each other. For example, APIs can include specifications for routines, data structures, object classes, and variables. An API specification can take many forms, including an International Standard such as POSIX, vendor documentation such as the Microsoft Windows API, and/or the libraries of a programming language (e.g., Standard Template Library in C++ or Java API).

Cloud-based (or simply cloud) APIs are a specific type of API that are used to build applications in the cloud computing market. Cloud APIs typically allow software to request data and computations from one or more services through a direct or indirect interface and most commonly expose their features via REST and/or SOAP. For example, vendor specific and cross-platform APIs can be made available for specific functions. Cross-platform interfaces typically have the advantage of allowing applications to access services from multiple providers without rewriting, but may have less functionality or other limitations in comparison to vendor-specific solutions.

Cloud-based APIs have become powerful tools that services, components, and devices routinely rely on and utilize. Unfortunately, there are several issues related to use and development of APIs. For example, it is often an arduous task for new cloud-based APIs to gain traction (or visibility) among developers. That is, when a cloud-based API developer designs a new API, making the world aware of the new API can be exceedingly difficult.

Furthermore, application developers (i.e., API consumers) designing new applications or refining existing applications often cannot easily find, test, and/or otherwise download cloud-based APIs (i.e., the client libraries) because APIs are currently not easily searchable and, if an appropriate API is found, it is not documented or otherwise defined in a standardized fashion. Consequently, application developers may have to download many APIs before they eventually find an appropriate API and, even then, usability and/or reliability of the API can be an issue.

SUMMARY

Systems and methods for facilitating distribution and consumption of APIs in a social cloud-based hub (or marketplace) are described herein. The social cloud-based API hub overcomes problems of the prior art by enabling users (i.e., API consumers) to access (e.g., search and/or otherwise utilize or consume) APIs that other users (i.e., API developers) submit to the social API hub in a standardized manner. The API consumers can test the APIs in the cloud without downloading the API and/or writing any additional code prior to consuming the API. Further, the systems and methods provide API developers with the ability to wrap APIs submitted to the hub in a standard description format and add one or more add-ons on top of the existing API infrastructure. The add-ons can provide additional functionality to an API without requiring API developers to write any additional code.

DETAILED DESCRIPTION

Figure 1:
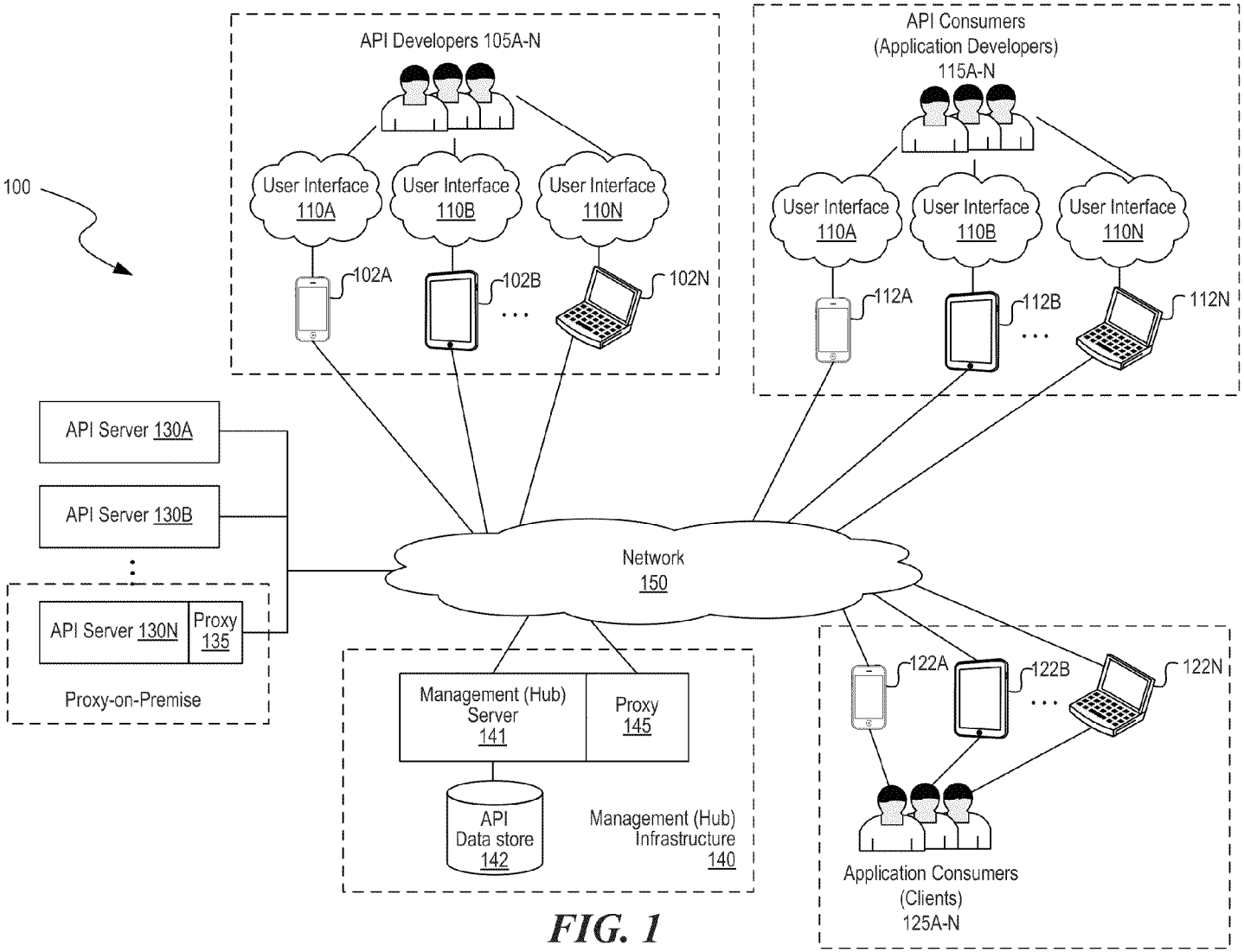
FIG. 1 depicts a block diagram of an online environment suitable for facilitating distribution and consumption of APIs in a social cloud-based hub.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems, methods, and a machine readable medium for distributing, monetizing, managing and consuming cloud APIs. The systems, methods, and a machine readable medium facilitate distribution and consumption of APIs in a social marketplace or hub. The social API hub enables users (i.e., API consumers) to access (e.g., discover, test, and/or otherwise utilize or consume) APIs that other users (i.e., API developers) submit to the hub in a standardized manner.

In one embodiment, a cloud API hub (also referred to as a "marketplace" herein; although, as will be described below, some APIs in the hub may not be available for public consumption) is described that facilitates discovering, documenting, monetizing, and consuming APIs. The cloud API hub allows users (i.e., API developers) to post/publish or otherwise distribute an API in the cloud so that third-party developers can use and improve on it. The cloud API hub auto-generates libraries in multiple languages providing for universal or near-universal access to the API. The auto-generated client libraries can include, among others, Bash, Ruby, Python, PHP, Node.js, C#, Java, and Objective-C. The hub allows users (i.e., API consumers) to consume APIs from any kind of source API server.

In one embodiment, users (i.e., API developers) can wrap up APIs submitted to the hub in a standard description format and add various add-ons (e.g., a billing system, authentication system, etc.) on top of an existing API infrastructure in order to provide additional functionality on top of the existing API functionality. The add-ons can be selected and added without requiring the API developers to perform any additional coding steps. A billing add-on, for example, allows users to create public and private billing plans for premium APIs. Additionally, with minimal server-side configuration, a user can configure quotas on custom objects, which provides for a granular control of billing API consumers.

In one embodiment, APIs can be easily documented in a standardized manner via an embedded editing interface graphical user interface (GUI). The documentation is then auto-generated and presented to developers so that they can understand and consume the API. Alternatively or additionally, an API can be documented via standard XML.

In one embodiment, users can post and/or publish their API or updates (or hacks) to their or others APIs in order to gain instant visibility for the API from an environment (i.e., the cloud-based hub) where developers are ready to consume the APIs. API developers can earn money for posting (or otherwise publishing) an API and selling the API. Thus, the systems and methods provide for a virtual central repository with robust, easy to use, and well-documented cloud APIs.

Environment

FIG. 1 depicts a block diagram of example environment 100 suitable for facilitating distribution and consumption of APIs in a social hub. The example environment 100 includes a plurality of API developers 105A-N operating client devices 102A-N, a plurality of API consumers 115 operating client devices 112A-N, a plurality of application consumers 125A-N operating client devices 122A-N, a plurality of API servers 130A-N, a management (or hub) infrastructure 140, and a network 150. Alternative configurations are possible.

As shown, the management (hub) infrastructure 140 includes management (hub) server 141, API data store 142, and proxy 145. The API data store 142 and/or the proxy 145 can be distributed (physically distributed and/or functionally distributed), in some embodiments such as, for example when the proxy is installed at or near the API server 130 (i.e., proxy-on-premise). Additionally, although shown separately, it is appreciated that an API developer can also be an API consumer and/or an application consumer of other APIs in the hub.

The management (hub) server 141 is configured to communicate with client devices 102A-N, 112A-N, and 122A-N, and API servers 130A-N for facilitating distribution and consumption of APIs in the cloud-based social hub. For example, an API developer 105 can interact with the management (hub) server 141 via a client device 112 in order to distribute and/or monetize an API (not shown) that the API developer has developed. The management (hub) server 141 acts as a virtual cloud-based social-infused central repository for the API so that application developers (i.e., API consumers) 115A-N can easily search and download APIs for consumption in and/or by their applications. The API servers 130A-N typically host the APIs locally. However, in some embodiments, the APIs may be hosted by the management (hub) infrastructure 140. In one embodiment, the management (hub) infrastructure 140 is entirely comprised of one or more management (hub) servers 141 which include one or more proxies 145 and the API data store 142.

As shown, API server 130 is configured in the proxy-on-premise configuration with proxy 135 installed locally. In this case, the proxy 135 (e.g., proxy server) may be utilized to act as a secure interface between clients and the API servers 130. Clients can thus access the API server 130 directly. A more detailed example illustrating the concept of proxy-on-premise is shown and discussed with respect to FIG. 7B.

The client devices 102A-N, 112A-N, and 122A-N are coupled to network 150. The client devices 102A-N, 112A-N and/or 122A-N can be any systems, devices, and/or any combination of devices/systems that are able to establish a connection with another device, server and/or other system. The client devices 102A-N and 112A-N typically include respective user interfaces 110A-N. Although not shown, in some embodiments, the client devices 122A-N can include similar functionality. The user interfaces 110A-N include one or more input devices and a display or other output functionalities to present data exchanged between the devices to a user. The user interfaces 110A-N can also include graphical user interfaces such as those examples discussed with respect to FIGS. 9-20. The client devices can include, but are not limited to, a server desktop, a desktop computer, a computer cluster, a mobile computing device such as a notebook, a laptop computer, a handheld computer, a mobile phone, a smart phone, a PDA, a BlackBerry™ device, a Treo™, and/or an iPhone or Droid device, etc.

The network 150 can be any collection of distinct networks operating wholly or partially in conjunction to provide connectivity to the client devices and hub server, and can appear as one or more networks to the serviced systems and devices. In one embodiment, communications to and from the client devices 102A-N, 112A-N and 122A-N can be achieved by, an open network, such as the Internet, or a private network, such as an intranet and/or the extranet. The network 150, to which the client devices 112A-N and 122A-N and API servers 130A-N are coupled, can be a telephonic network, an open network, such as the Internet, or a private network, such as an intranet and/or the extranet. For example, the Internet can provide file transfer, remote log in, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

The client devices 102A-N, 112A-N, and 122A-N and API servers 130A-N can be coupled to the network 150 (e.g., Internet) via a dial-up connection, a digital subscriber loop (DSL, ADSL), cable modem, wireless connections, and/or other types of connection. Thus, the client devices 102A-N, 112A-N, and 122A-N can communicate with remote servers (e.g., API servers 130A-N, hub servers, mail servers, instant messaging servers, etc.) that provide access to user interfaces of the World Wide Web via a web browser, for example.

API data store 142 can store information such as software, APIs, analytics, authentication information, user information, descriptive data, images, system information, drivers, and/or any other data items utilized by the management (hub) server 141 for operation. In one embodiment, API data store 142 can be managed by a database management system (DBMS), for example but not limited to, Oracle, DB2, Microsoft Access, Microsoft SQL Server, PostgreSQL, MySQL, FileMaker, etc. Databases 141-143 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. As shown, the API data store 142 is coupled to management (hub) server 141. It is appreciated that, in some embodiments, API data store 142 may be coupled directly to network 150.

Figure 2:
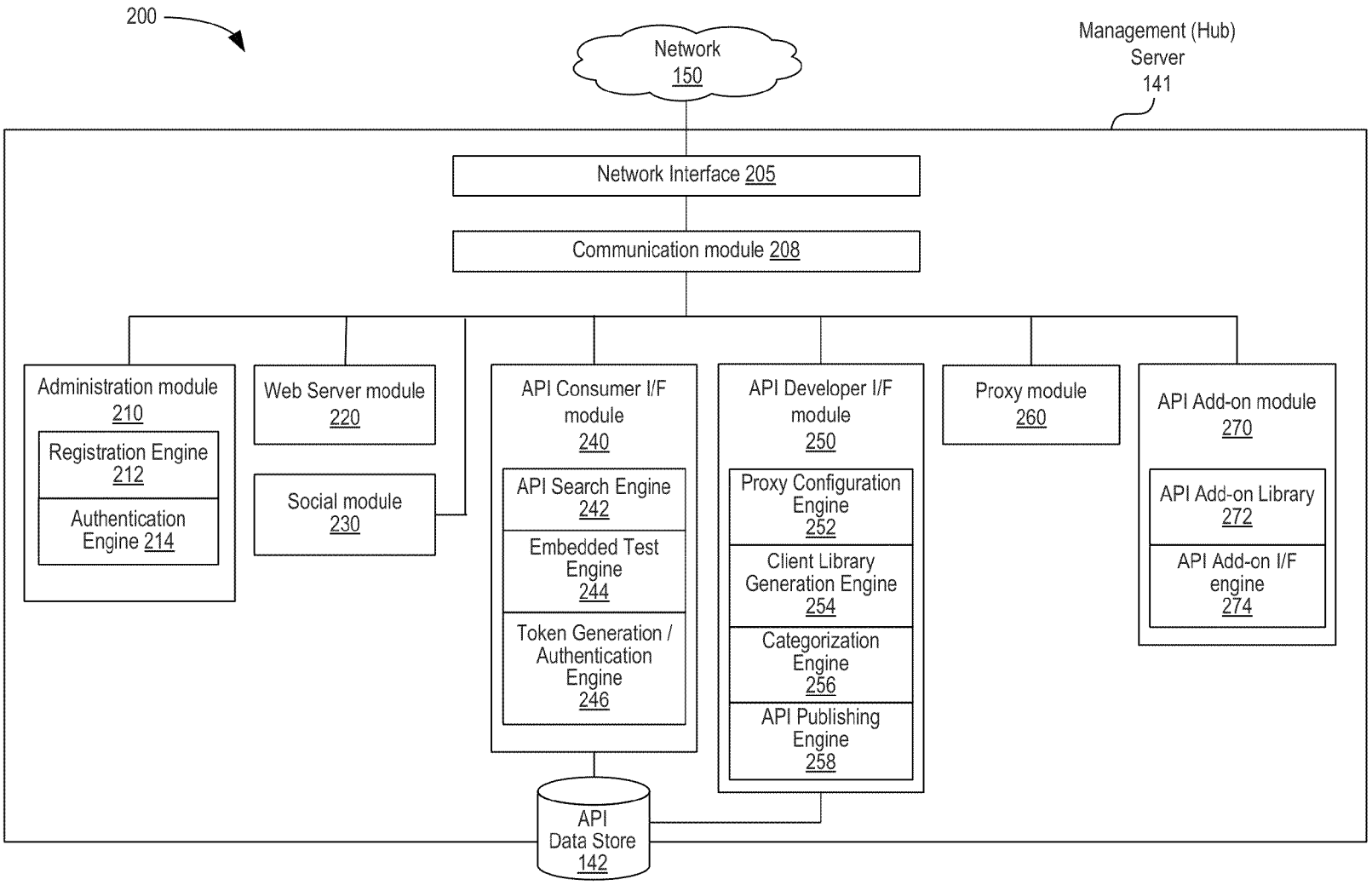
FIG. 2 depicts a block diagram illustrating the components of a hub server suitable for facilitating distribution and consumption of APIs in a social cloud-based hub.

FIG. 2 depicts a block diagram illustrating an example system 200 that facilitates distribution and consumption of APIs in an API hub. The system 200 includes management (hub) server 141 coupled to API data store 142. As shown, the management (hub) server 141 is the management (hub) server of FIG. 1, although alternative configurations are possible.

The management (hub) server 141, although illustrated as comprised of distributed components (physically distributed and/or functionally distributed), could be implemented as a collective element. In some embodiments, some or all of the modules, and/or the functions represented by each of the modules, can be combined in any convenient or known manner. Furthermore, the functions represented by the modules and/or engines can be implemented individually or in any combination thereof, partially or wholly, in hardware, software, or a combination of hardware and software.

In the example of FIG. 2, the management (hub) server 141 includes a network interface 205, a communication module 208, an administration module 210, a web server module 220, a social module 230, an API consumer interface module 240, an API developer interface module 250, a proxy module 260, and an API add-on module 270. Additional or fewer modules can be included.

The management (hub) server 141 can be communicatively coupled to the API data store 142, as illustrated in FIG. 2. In some embodiments, the API data store 142 is partially or wholly internal to the management (hub) server 141. In other embodiments, the API data store 142 is coupled to the management (hub) server 141 over network 150. In one or more embodiments, the API data store 142 is a distributed database.

In the example of FIG. 2, the network interface 205 can be one or more networking devices that enable the management (hub) server 141 to mediate data in a network with an entity that is external to the server, through any known and/or convenient communications protocol supported by the host and the external entity. The network interface 205 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

In the example of FIG. 2, the management (hub) server 141 includes the communications module 208 communicatively coupled to the network interface 205 to manage a communication session over a plurality of communications protocols. In one embodiment, the communications module 208 receives data (e.g., audio data, textual data, audio files, etc.), information, commands, requests (e.g., text and/or audio-based), and/or text-based messages over a network. Since the communications module 208 is typically compatible with receiving and/or interpreting data originating from various communication protocols, the communications module 208 is able to establish parallel and/or serial communication sessions with users of remote client devices, merchant POS devices, payment systems, advertisers, web servers, and data miners.

One embodiment of the management (hub) server 141 includes an administration module 210. The administration module 210 can be any combination of software agents and/or hardware components able to manage and register users of management (hub) server 141. The administration module 210 includes a registration engine 212 and an authentication engine 214.

In one embodiment, the registration engine 212 is configured to register new users including API developers and/or API consumers. This process may involve creating new accounts with the management (hub) server 141. In one embodiment, during the registration process, a user can provide login credential for the various social networking sites that they would like to log-in to or from, and to which the user would like to provide status updates from the management (hub) server 141. The authentication engine 214 is configured to authenticate the hub users as they access the management (hub) server 141 from a variety of devices. In some embodiments, authentication occurs by associating a user's username and password with an existing user account and/or associating an affiliate POS device with an existing affiliate account and/or associating an advertiser's username and password with an existing advertiser account. Unauthorized users can be directed to register with the system.

One embodiment of the management (hub) server 141 includes a web server module 220. The web server module 220 can be any combination of software agents and/or hardware components able to interact with users that have logged in or otherwise accessed or interacted with the management (hub) server 141. In one embodiment, the web server module 220 provides access to API developers and API consumers via an online platform (e.g., web interface). The web server module 220 presents or otherwise provides access to the virtual cloud-based social-infused central repository for APIs that is managed by the management (hub) server 141. For example, graphical interfaces such as those described in FIGS. 9-20 may be provided and/or otherwise served to client devices by the web server module 220.

One embodiment of the management (hub) server 141 includes a social module 230. The social module 230 can be any combination of software agents and/or hardware components able to provide users (e.g., API consumers and API developers) with social components. For example, each API can include a chat area, an issues area, notification areas, etc., that provides indications about the users that hack on (e.g., aid in the development of) and/or consume specific APIs. The chat area can allow users to discuss, for example, useful aspects of an API. Similarly, the issues area can alert users as to specific bugs and/or bug fixes or workarounds. The indications about the users that hack and/or otherwise utilize particular APIs is an interesting social aspect that allows users to see which APIs other users are consuming. The social module 230 can also provide private and/or public messaging services, boards for questions related to specific APIs or general APIs, monitoring information about general and/or specific APIs such as, for example, ratings of APIs, reviews of APIs, etc. Additionally, the social module 230 may provide an area to raise tickets (e.g., to fix bugs in APIs), etc.

Figure 15:
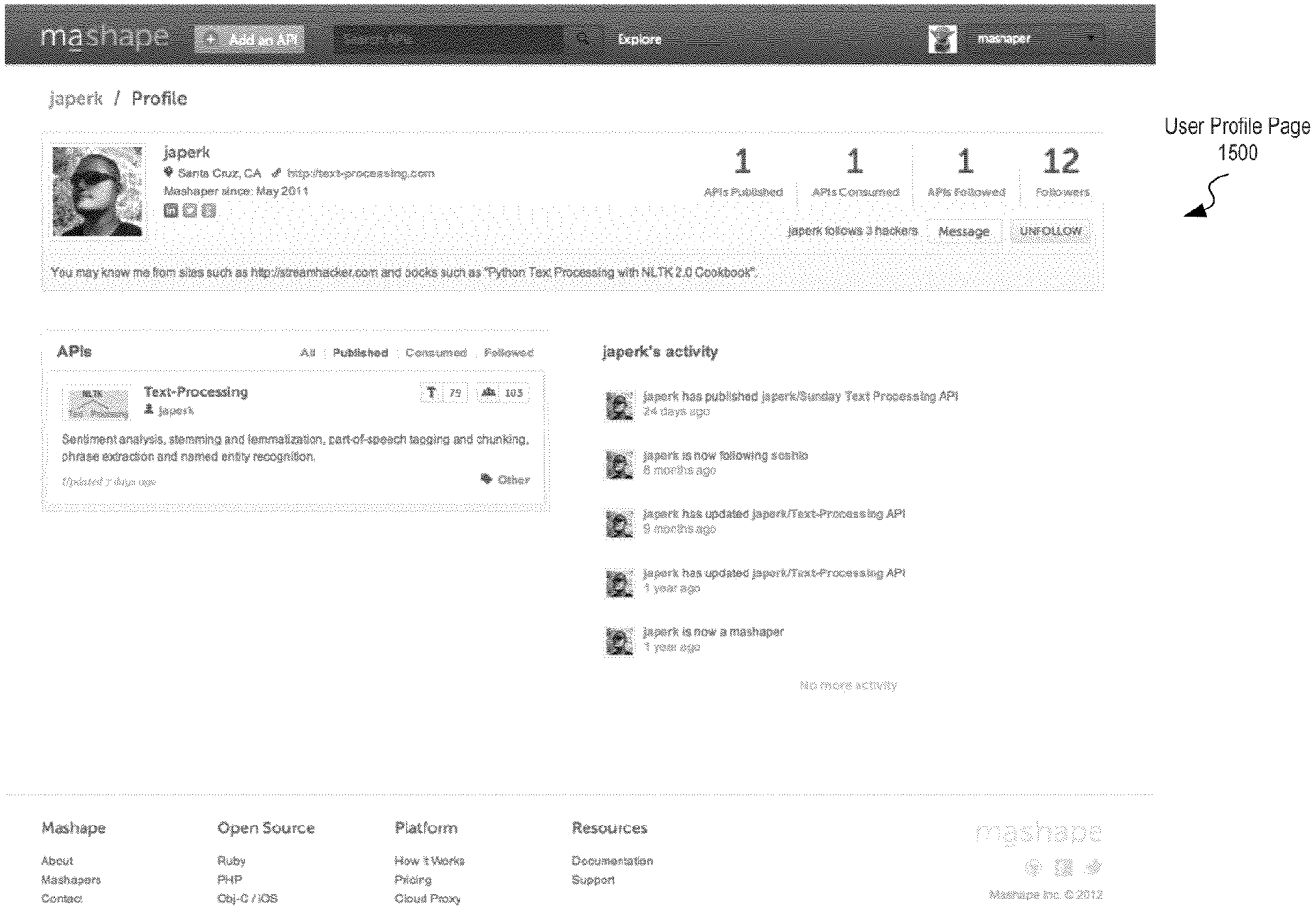
FIG. 15 illustrates an example user interface depicting a user homepage for use in a social cloud-based hub.

The social module 230 also allows users to maintain a personal profile. An example personal profile is shown in FIG. 15. The user may link Facebook, LinkedIn, GitHub, and/or Twitter accounts to their profile in order to stay connected with other developers and friends and to keep apprised of the latest APIs that their friends are using, etc. Users can also follow one another within the API hub system. The users can also have auto-generated reputations attached to their personal profiles so that developers can literally know "who's who" among the API community.

One embodiment of the management (hub) server 141 includes an API consumer interface module 240. The API consumer interface module 240 can be any combination of software agents and/or hardware components able to allow API consumers to search, test, and/or otherwise access the API in the hub. The API consumer interface module 240 includes an API search engine 242, an embedded test engine 244, and a token generation/authentication engine 246.

In one embodiment, the API search engine 242 is configured to receive and process search queries received from users (i.e., API consumers). For example, when a search query is received, the API search engine 242 searches the categorized API data store 142 based on the search query, and returns one or more APIs that match the query. The query can be, for example, a text based search inquiry. In one embodiment, the embedded test engine 244 allows a user to test the API in the cloud prior to actual use and/or integration in an application. Advantageously, the API can be tested in the cloud (e.g., online) without writing any code. The token generation/authentication engine 246 generates authentication tokens for consuming clients to consume APIs. This process is discussed is greater detail with reference to FIG. 5, but generally the tokens provide for additional security in some embodiments.

One embodiment of the management (hub) server 141 includes an API developer interface module 250. The API developer interface module 250 can be any combination of software agents and/or hardware components able to interface with an API developer to publish an API. The API developer interface module 250 includes a proxy configuration engine 252, a client library generation engine 254, a categorization engine 256, and an API publishing engine 258.

In one embodiment, in order to provide secure communications between and API server and clients (e.g., API consumers), the proxy configuration engine 252 configures a proxy such as, for example, proxy 145 of FIG. 1. The API server serves the API. The API servers can be local or remote to the management (hub) server 140. In one embodiment, the client library generation engine 254 is configured to automatically generate a plurality of client libraries based on user-generated parameters associated with the API. The user-generated parameters are provided by an API developer prior to publishing the API. Once published, the API is available for use by API consumers in the social hub. In one embodiment, the API publishing engine 258 publishes the API in the social hub (i.e., makes the API available for download and/or consumption by API consumers via the online platform).

One embodiment of the management (hub) server 141 includes a proxy module 260. The proxy module 260 can be any combination of software agents and/or hardware components able to perform proxy operations as described herein. For example, in one embodiment, the proxy provides secure communications between the API and clients (e.g., API consumers). Like other modules described with respect to the management (hub) server 141, in some embodiments, the proxy module 260 may be external to the management (hub) server 141.

In one embodiment, the proxy is programmable via either or both of the proxy module 260 or the proxy configuration engine 252. Programmable proxies are easily expandable with more features and/or connectablity with third-party services. With a programmable proxy, add-ons can modify an API request at any point in the lifecycle of the request, block execution of the request (e.g., through authentication), read and modify the response from an API server, etc. As discussed, the add-ons can be installed locally (i.e., proxy-on-site) or remotely (i.e., proxy module 260 of FIG. 2 or proxy 145 of FIG. 1). If the add-ons are installed remotely, the customer need not work directly with them because the proxy auto-configures by automatically downloading the required information from the remote servers and activating the appropriate add-ons during the execution. The proxy can identify the API by analyzing the requested URL/domain name/DNS information (e.g., CNAME entry). Example using the proxy are discussed in greater detail with respect to FIGS. 6-8.

One embodiment of the management (hub) server 141 includes an API add-on module 270. The API add-on module 270 can be any combination of software agents and/or hardware components able to provide API developers a plurality of add-ons for including with a published API. The API add-on module includes an API add-on library 272 and an API add-on UF engine 274. In one embodiment, the API add-on library 272 stores a plurality of add-ons that a developer can select to include on top of an API. For example, the add-on library 272 can include various add-ons that can be included with an API for consumption in the hub. For example, the add-on library 272 can include billing add-ons, analytics add-ons, authentication add-ons, etc. The add-on is typically a piece of code that connects a proxy with a third-party service or extends the proxy functionalities. As will be discussed below in greater detail, the add-ons can be executed during the lifecycle of the API request or stand-alone. In one embodiment, the API add-on I/F engine 274 can interface with an APT developer to wrap one or more add-ons around an API.

Figure 3:
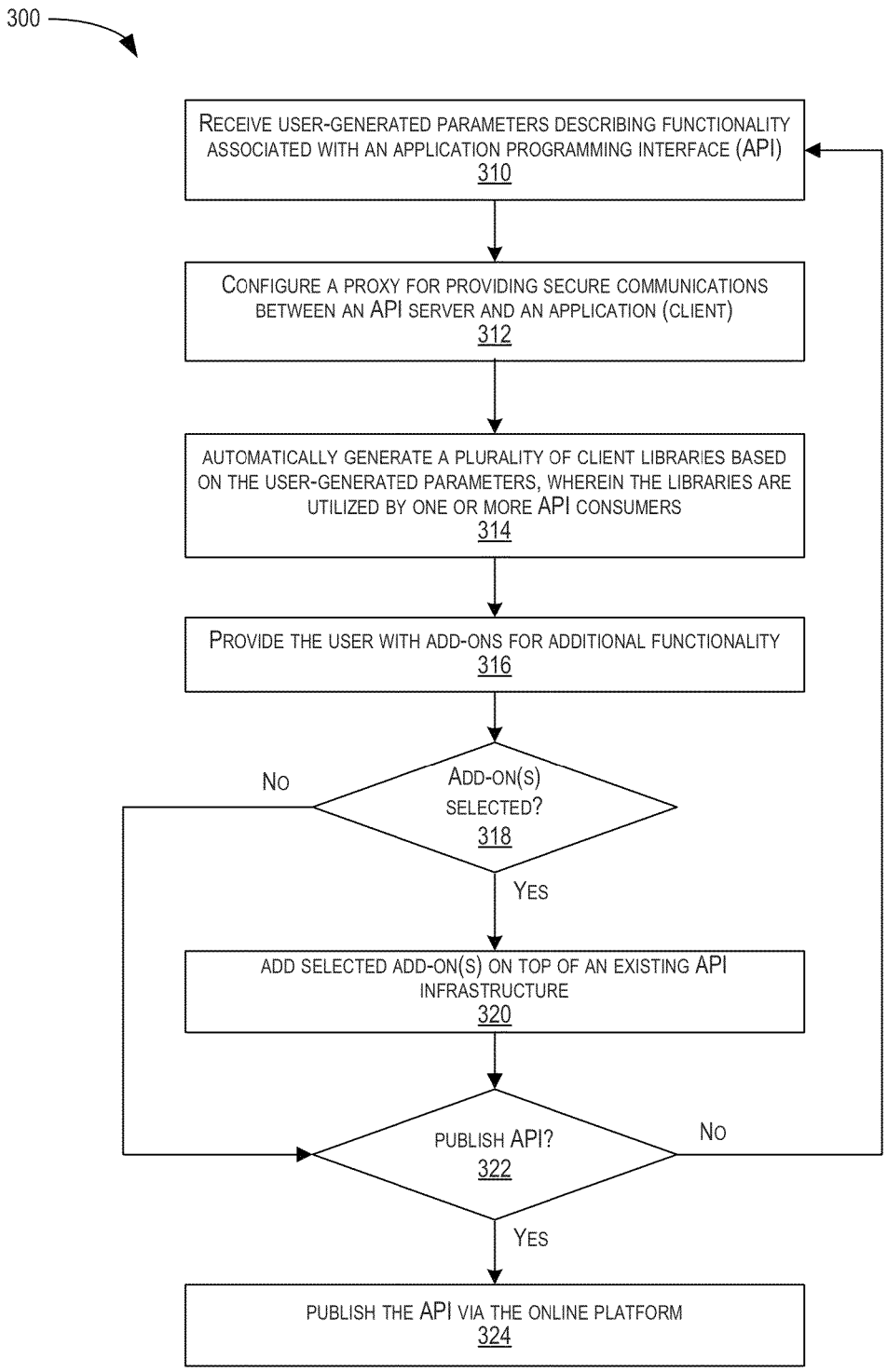
FIG. 3 depicts a flow diagram illustrating an example process for facilitating distribution of APIs in a social cloud-based hub.

FIG. 3 depicts a flow diagram illustrating an example process 300 for facilitating distribution of APIs in a social cloud-based hub, according to an embodiment. More specifically, example process 300 illustrates an example of a user (i.e., API developer) publishing an API to a management (hub) server. In one embodiment, the management (or hub) system performs example process 300.

To begin, the management server receives user (i.e., API developer) login information or credentials. In some embodiments, the login information can include a customer identification (ID)/password combination. In process 310, the management server receives user-generated parameters describing functionality associated with an API that the user wants to publish in the social cloud-based hub. The parameters can include definitions of API name, tags, versions, public/private (i.e., public APIs are indexed), descriptions of the API and/or versions of the API, various target information, and various proxy information. Private APIs can be download by only a selected group of API developers.

Target information can define target URLs and/or services that the API invokes, the interface structure for the API, operations of the API, etc. The targets can be defined as production and/or sandbox (e.g., development). The structure of an API can be defined such as, for example, a SOAP or REST service and profile information such as input/output requirements (e.g., XML/JSON, etc.). The operations such as LIST, READ, ADD, etc. can each have an associated method (e.g., GET, POST) and an associated path. The proxy definition provides information about how the API looks, what context prefixes and paths it requires, etc.

In process 312, the management system configures a proxy for providing secure communications between an API server and client (e.g., application consumers). In process 314, the management server automatically generates a plurality of client libraries based on the user-generated parameters. The client libraries are utilized by one or more API consumers. In process 316, the user is provided a selection of add-on to wrap around their API. As discussed, the add-ons can provide additional functionality to APIs. In process 318, the management system determines whether any add-ons are selected and, if so, in process 320, wraps the one or more selected add-ons on top of the existing API infrastructure.

In process 322, after configuration is completed, the management server determines whether or not the user wants to publish the API. If so, in process 324, the management server publishes the API in the online platform. Otherwise, the API developer can go back and make additional changes quit and cancel the API publication process.

Figure 4:
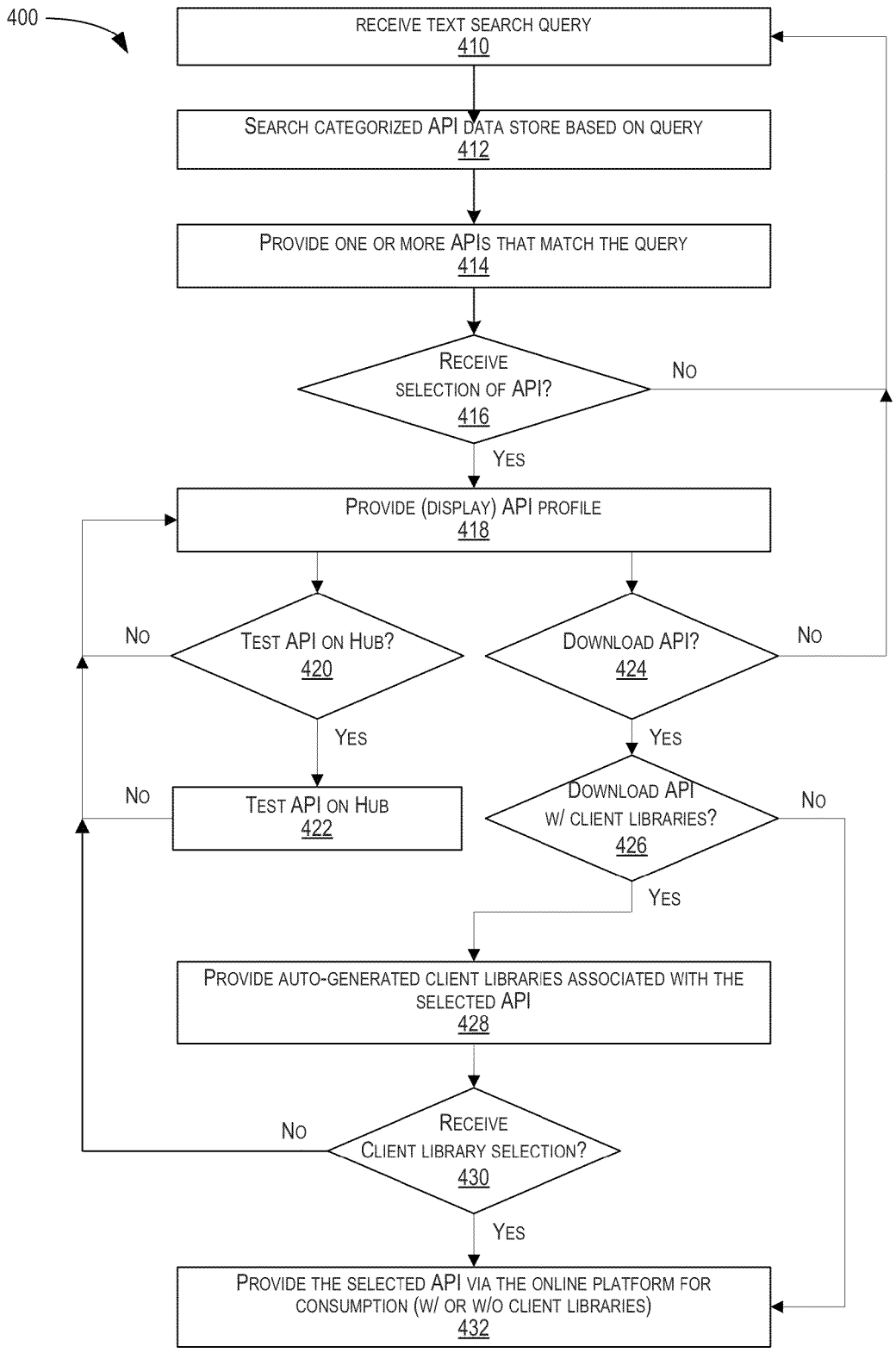
FIG. 4 depicts a flow diagram illustrating an example process for facilitating consumption of APIs in a social cloud-based hub.

FIG. 4 depicts a flow diagram illustrating an example process 400 for facilitating consumption of APIs in a social cloud-based hub, according to an embodiment. More specifically, example process 400 illustrates an example of a client (i.e., API consumer) consuming or otherwise obtaining an API using the management (hub) server. In one embodiment, the management (hub) server performs example process 400.

To begin, the management server receives user (i.e., API developer) login information or credentials. In some embodiments, the login information can include a customer identification (ID)/password combination. In process 410, the management server receives a text-based search query. For example, a client (i.e., API consumer) consuming or otherwise obtaining an API using the management (hub) server can enter a text-based search string into the search interface. An example search interface is shown and discussed in greater detail with reference to FIG. 9.

In process 412, the management server, searches a categorized (or indexed) API data store based on the query information and, in process 414, provides one or more APIs that match the search criteria. An example search results page is shown and discussed in greater detail with respect to FIG. 10.

Figure 11A:
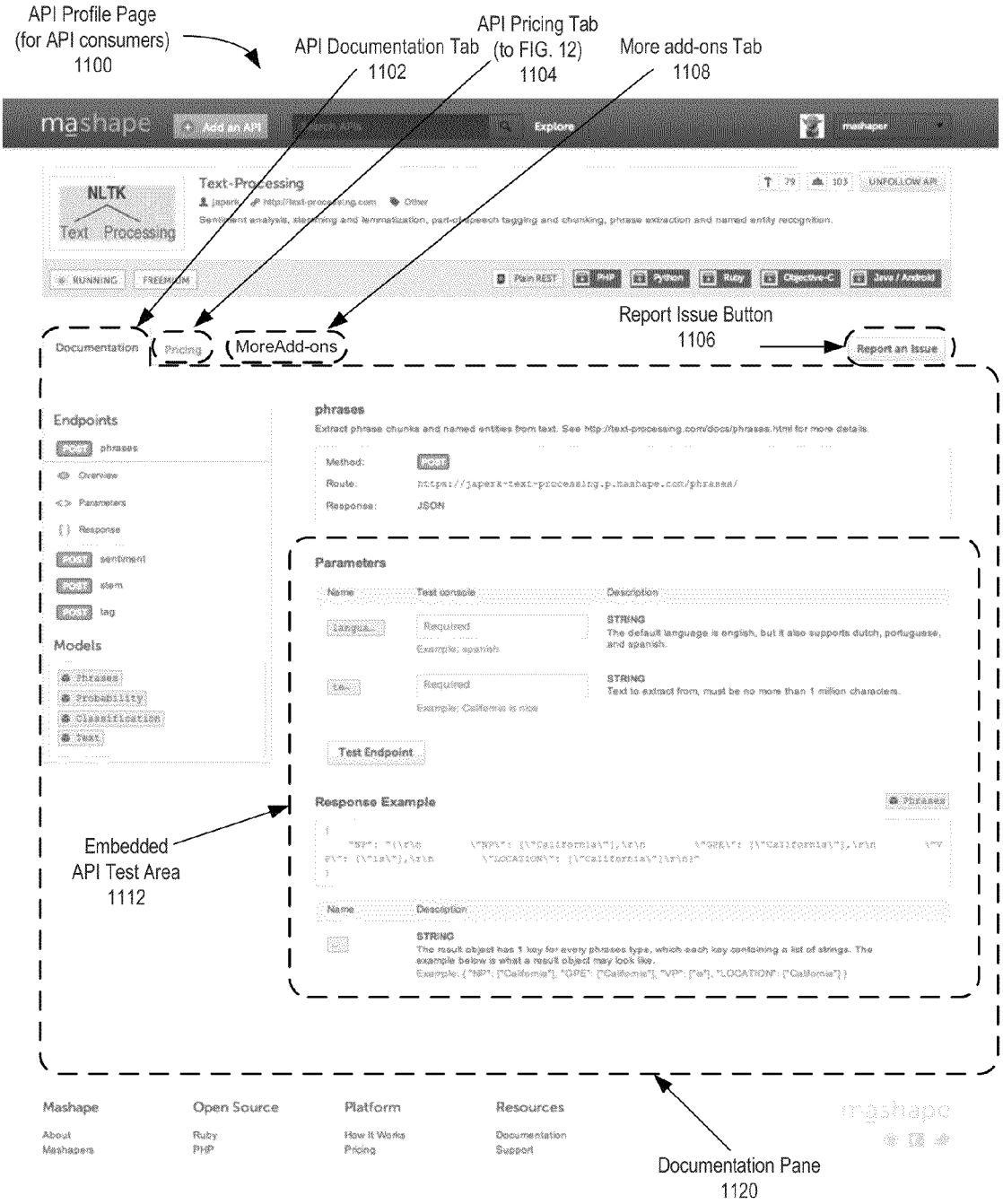
FIGS. 11A-C illustrate an example user interface depicting an API profile page for use in a social cloud-based hub.
Figure 11B:
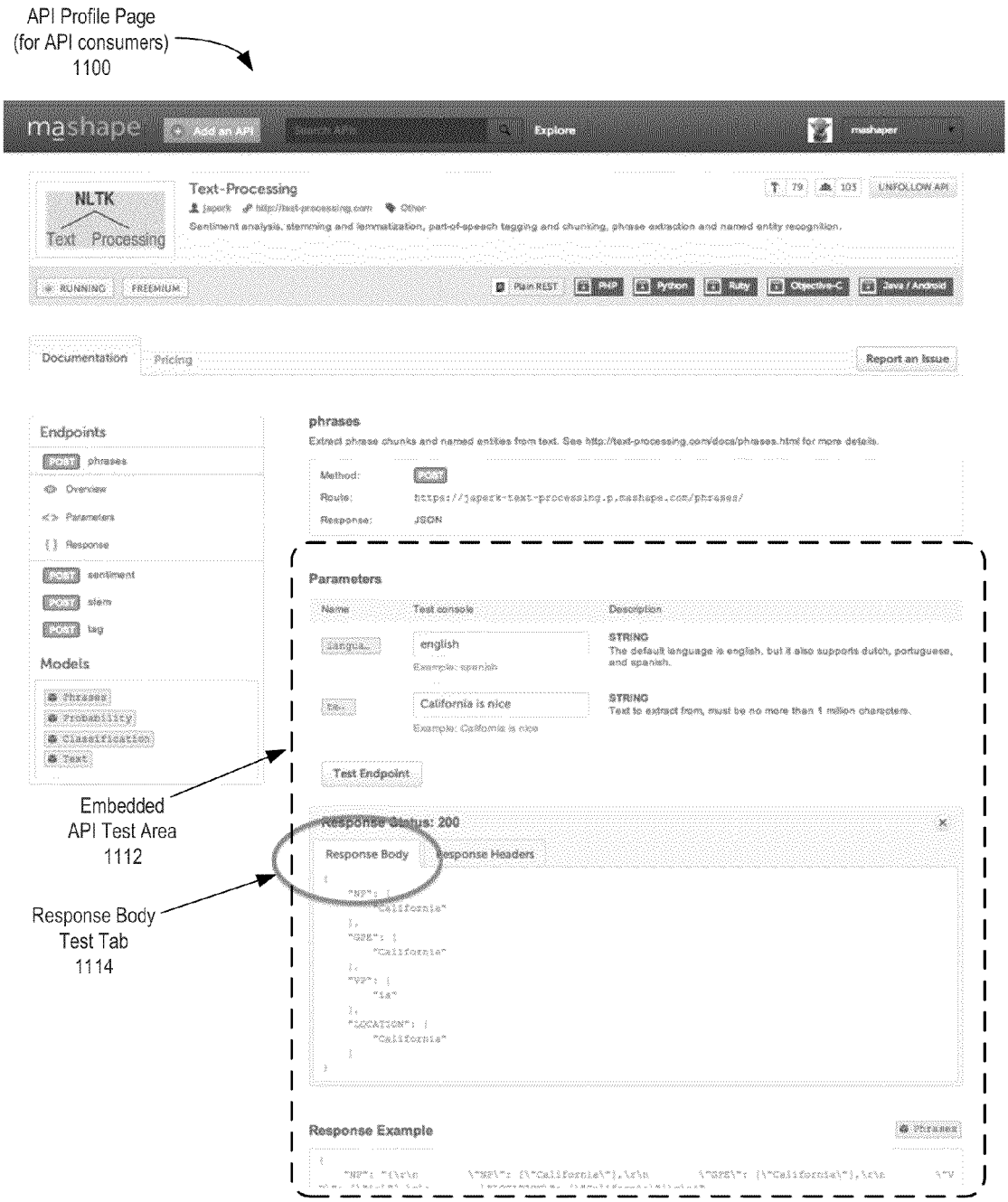
Figure 11C:
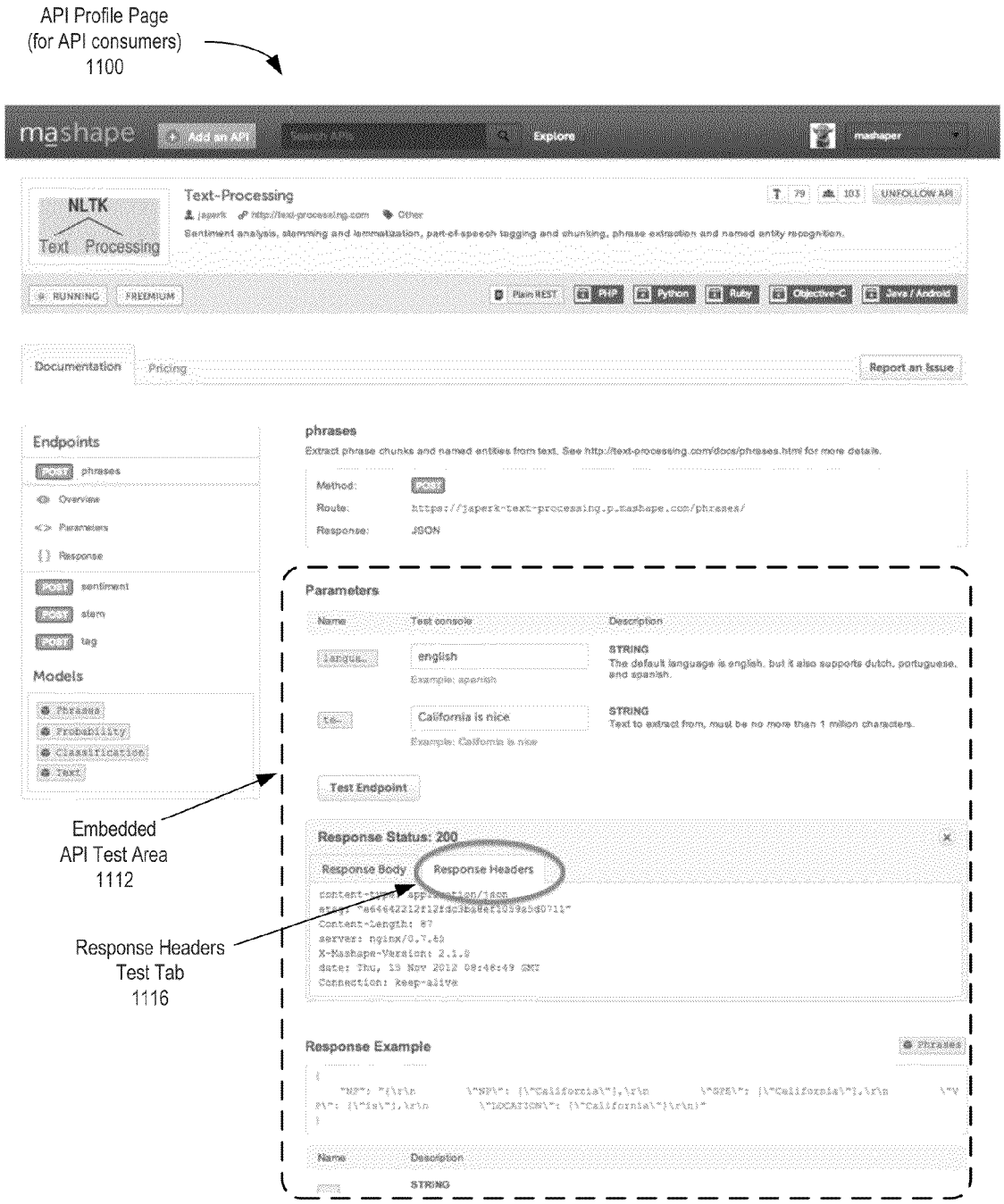

In process 416, the management server determines if the API consumer has made a selection of an API. If so, in process 418, the management server provides (or displays) an API profile associated with the API to the user. An example API profile is shown and discussed in greater detail with respect to FIGS. 11A-C and 12. In process 420, the management server determines whether the API consumer wishes to test the API on the hub and, if so, in process 422 the management server tests the API without requiring the user to write any additional code. In one embodiment, the test interface is embedded in the graphical user interface as illustrated in FIGS. 11A-C.

In process 424, the management server determines if the API consumer wants to download the API. If so, in process 426, the management server determines if the API consumer wants to download the API with the client libraries. If so, in process 428, the management server provides the auto-generates client libraries associated with the selected API to the user. In process 430, the management server determine if the API consumer has selected one of the API libraries. If so, in process 422, the management server provides (downloads) the selected API to the API consumer via the online platform.

Programmable API Proxy

Figure 5:
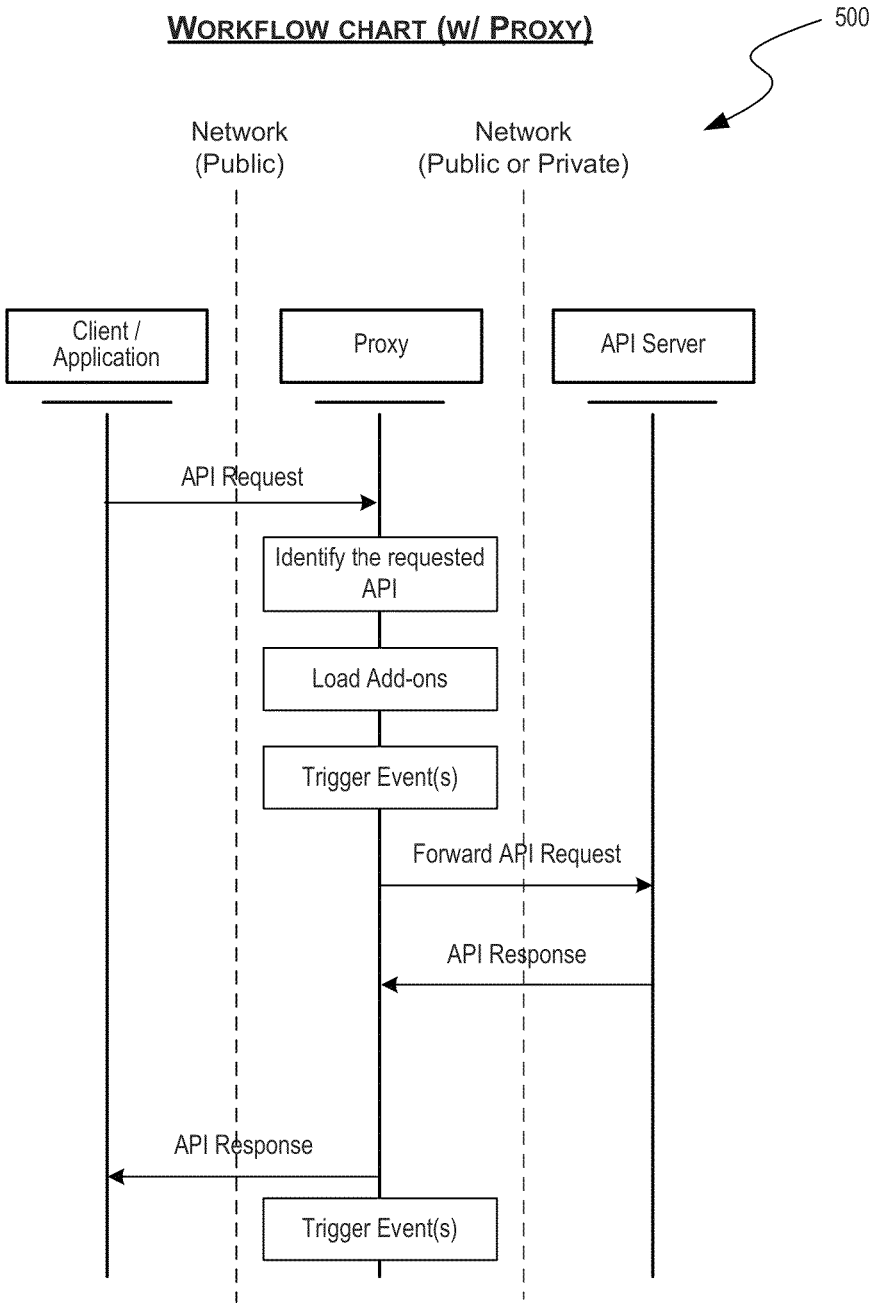
FIG. 5 depicts a signaling diagram that illustrates representative messaging used by a client application, a proxy, and an API server to facilitate consumption of an API in a social cloud-based hub.

FIG. 5 depicts a signaling diagram 500 that illustrates representative messaging used by a client application, a proxy, and an API server to facilitate consumption of an API in a social cloud-based hub, accordingly an embodiment. The client system, management server, and API server could be an API consumer device 122, management (hub) server 140, and API server 130 of FIG. 1, respectively; although alternative configurations are possible.

Add-ons, as discussed herein, can be loaded at any time during execution of the proxy (not necessarily at startup). It is appreciated that any of the methods of loading the add-ons described herein can co-exist. In one embodiment, add-ons can execute (or work) in two modes. In one mode, the add-on works during the lifecycle of an API request (e.g., when certain events are triggered, like "onStart," "onEnd," etc.). In a standalone mode, the add-on is not triggered by an API request but rather some other event (e.g., a timer that invokes add-on every thirty seconds). The example of FIG. 5 illustrates an example of the former mode (i.e., workflow of an add-on tied with the lifecycle of the request).

To begin, a client makes an API request. The proxy identifies the API request, and loads the APIs installed add-ons if not already completed (e.g., either locally or remotely). The proxy then triggers one or more events that activate the installed add-ons. If the add-ons do not block execution (an authentication may block an unauthorized request), the proxy forwards the request to the appropriate API server (API hub server). The proxy subsequently receives a response from the API server and triggers other events (e.g., "onClose"). Lastly, a response is sent back to the client.

In one embodiment, the management (hub) server and the entire API conforms to the design principles of Representational State Transfer (REST). In this case, methods to retrieve data from the management (hub) server require a GET request, while methods to submit, change, or destroy data require a POST, PUT, or DELETE. The API supports JavaScript Object Notation (JSON) data. Because the API can be a REST API that runs over HTTP, this also means that the API can be accessed by any application or device that has an internet connection and can speak HTTP.

A developer can create any APIs. For example, apart from listing services, a developer could create an API for (by way of example, and not limitation): audio services, document conversion, email services, financial services, geolocalization services, graph generation, image services, news aggregators, SMS services, statistical services, text-to-speech services, translation services, video services, whois services, wrappers around existing services (e.g., Facebook, Twitter, etc.), etc.

Figure 6A:
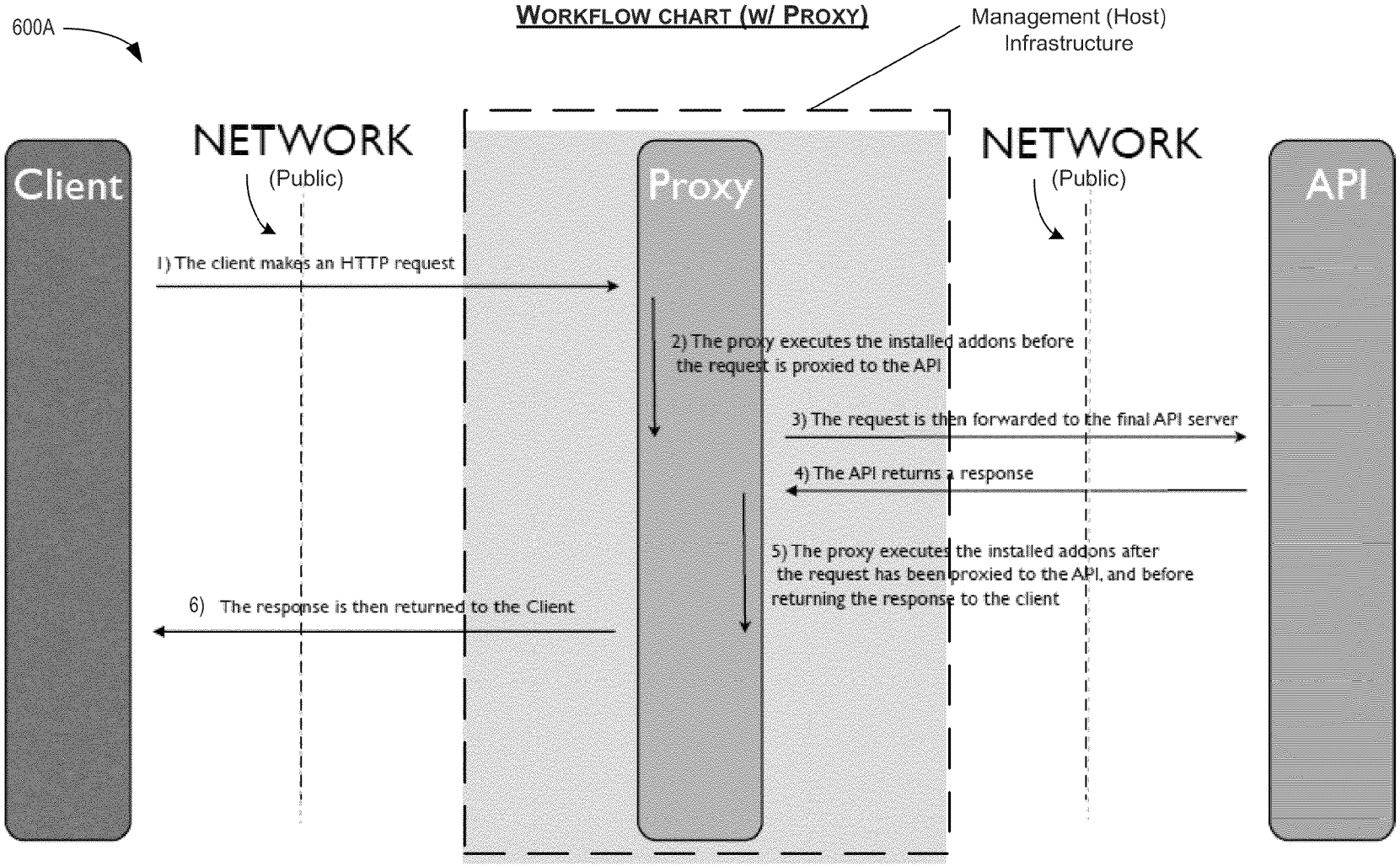
FIG. 6A depicts a signaling diagram that illustrates representative messaging used by a client application, a proxy, and an API server to facilitate consumption of an API in a social cloud-based hub.
Figure 6B:
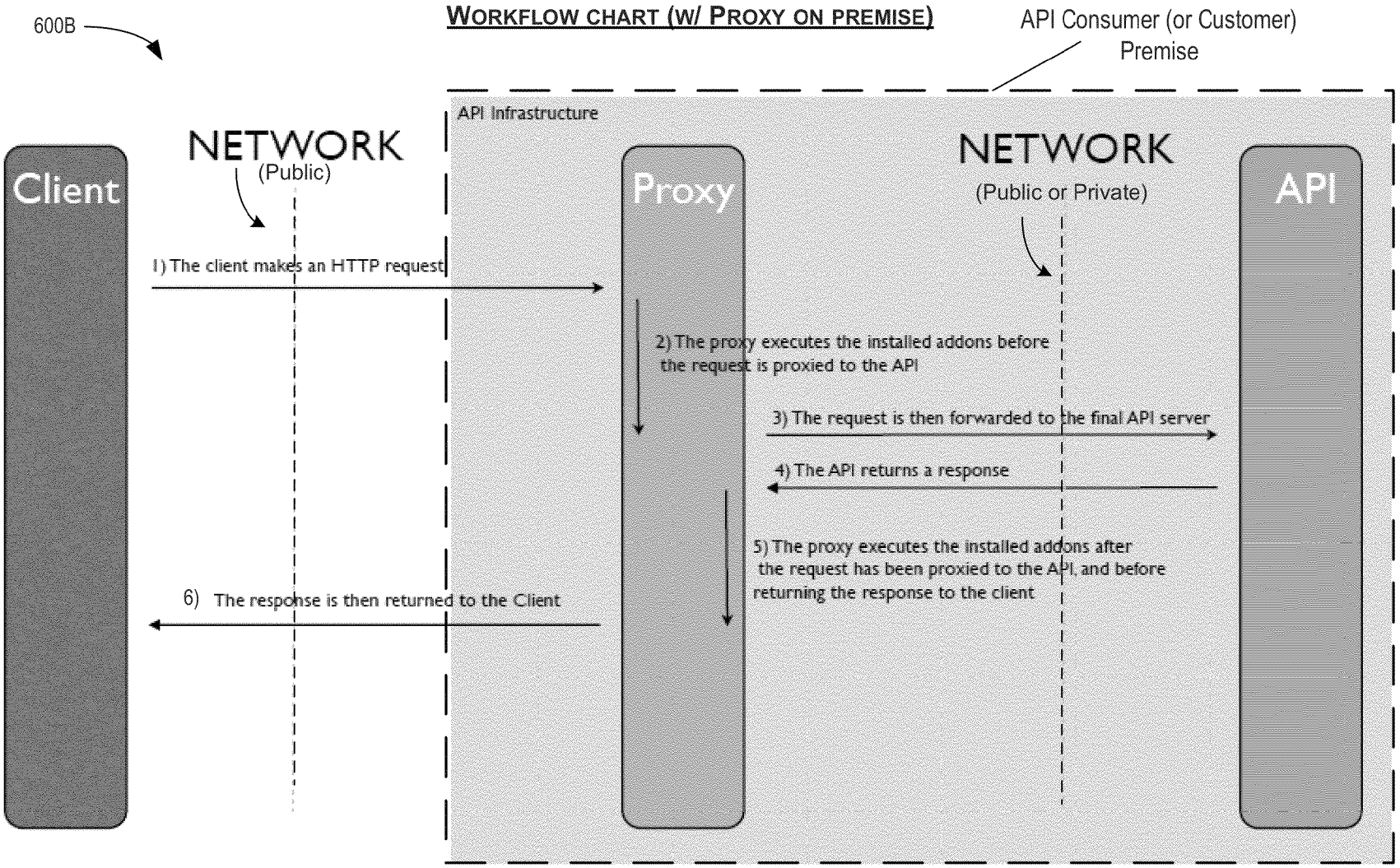
FIG. 6B depicts a signaling diagram that illustrates representative messaging used by a client application, an on-premise proxy, and an API server to facilitate consumption of an API in a social cloud-based hub.

FIGS. 6A and 6B depict signaling diagrams 600A and 600B, respectively, that illustrate representative messaging used by a client application, a proxy, and an API server to facilitate consumption of an API in a social cloud-based hub. FIG. 6A illustrates an example whereby the proxy is installed remotely (remote to the API server). FIG. 6B illustrates an example whereby the proxy is installed locally (downloaded and installed on the API provider infrastructure—also called "proxy-on-premise").

In process 1, a client makes an HTTP request to the proxy. In process 2, the proxy executes the installed add-ons before the request is proxied to the API. In process 3, the request is forwarded to the final API server. In process 4, the API returns a response. In process 5, the proxy executes the installed add-ons after the request has been proxied to the API, and before returning the response to the client. Lastly, in process 6, the response is returned to the client.

Figure 6C:
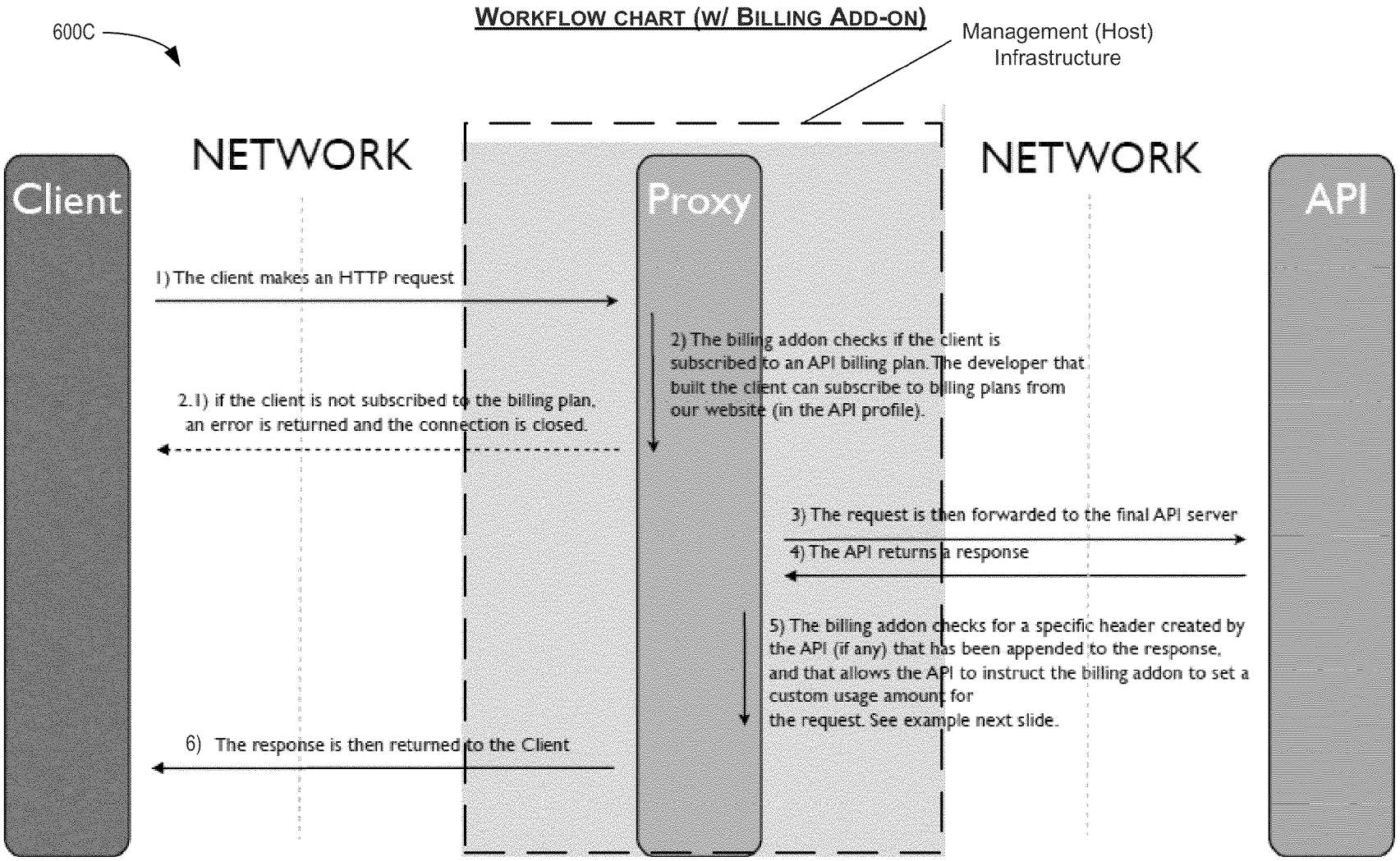
FIG. 6C depicts a signaling diagram that illustrates representative messaging used by a client application, a proxy, and an API server to facilitate consumption of an API with a billing add-on in a social cloud-based hub.

Some add-ons are executed before the request is proxied (at process 2). Others are executed after the request has been proxied (at process 5). Yet other add-ons are executed both at process 2 and process 5. For example, the Authentication add-on that validates the client, is executed before the request is proxied because if the client is not authenticated then an error is returned and the connection is closed immediately. The billing add-on is executed before and after. That is, the billing add-on is executed before because it needs to check if the client is subscribed to a billing plan of the API (if not, close connection and return error) and after, because it needs to parse the API server response to set the billing usage for the client. FIG. 6C discusses a billing add-on in greater detail.

In the examples of FIG. 6A and 6B the programmable API proxy is an HTTP(s) proxy that can be put in front of an API of any kind. As shown, the programmable API proxy can be utilized in the cloud and/or can be installed in a customer's infrastructure (i.e., a customer is an API developer or owner of an API that has been published in the hub). The programmable API proxy may be proxy 145 of FIG. 1, although alternative configurations are possible.

In one embodiment, the programmable API proxy can be expanded with one or more add-ons. For example, an add-on may include, but is not limited to, a billing add-on, an analytics add-on, an authentication add-on, etc. An example billing add-on is discussed in greater detail with respect to FIG. 6C. In this context, an add-on is a snippet or piece of computer programmable code that connects the proxy with a third-party service and/or otherwise extends the proxy functionalities. The add-on can be executed during the lifecycle of the API request or standalone. More specifically, an add-on can be: 1) a connector to a service not included into the proxy; 2) an extension to the proxy that executes computations on the API request (e.g., a format transformation from XML to JSON).

Add-ons can be installed locally and/or remotely. If an add-on is installed remotely, and the proxy serves more than one API server, then the installed add-on list is downloaded from the remote server. In this case, the installed add-on list is downloaded from the remote server so that only those add-ons that the customer has selected are executed.

FIG. 6C depicts a signaling diagram 600C that illustrates representative messaging used by a client application, a proxy, and an API server to facilitate consumption of an API with a billing add-on in a social cloud-based hub, according to an embodiment. Although shown as a remote proxy, it is appreciated that the billing add-on can also be configured as a proxy-on-premise in other embodiments.

In process 1, a client makes an HTTP request to the proxy. In process 2, the billing add-on checks if the client is subscribed to an API billing plan (the developer that build the client can subscribe to billing plans from the management (hub) server in the API profile. In process 2.1, the management server returns an error to the client and closes the connection with the client if the client is not subscribed to the billing plan. In process 3, the request is forwarded to the final API server. In process 4, the API returns a response. In process 5, the billing add-on checks for specific information created by the API (e.g., a specific header) that is appended to the response. The billing add-on also allows the API to instruct the billing add-on to set a customer usage amount for the request. Lastly, in process 6, the response is returned to the client.

When an API provider adds the billing add-on for his API, he can create subscription plans that the developers who build the clients can subscribe to. The billing plans created by the API provider can include the notion of "Custom Objects," for example. The plans can charge the user upon the amount of "Statuses Classified." The proxy, which just proxies the HTTP request, may not know what that request actually does. Thus, for the user to be actually charged, the system needs to know how many "Statuses Classified" requests were made. The proxy can't increment by itself the usage of the "Statuses Classified" counter associated to the user, because it doesn't know what the request does and how many "Statuses Classified" were consumed during the request.

To indicate to the proxy, and more specifically, to the Billing Add-on, how many billing objects were consumed by the request (e.g., "Statuses Classified"), the API provider can either choose to:

1) Configure the billing add-on to automatically increment by one unit the billing objects. This increments every billing object specified without assuring that this is actually true. Because the proxy and the billing add-on don't know what the request really does and how many billing objects were consumed in the request, it will just increment by one the usage.

2) Return an additional header that tells the billing add-on to increment the usage of the custom billing object by a specific amount. For example, the API provider can return the following header: "X-Mashape-Billing: statuses classified=5." This header tells the billing add-on that the request made by the client consumed five units of "Statuses Classified." In this example, the header name and value are arbitrary. Any header name and a header value could potentially be used. The name of the billing object is also arbitrary and set by the API provider. For example, an API may not have a "Status Classified" object, but could have "DETECT" and/or "RECOGNIZE" billing objects.

Figures 7, 8:
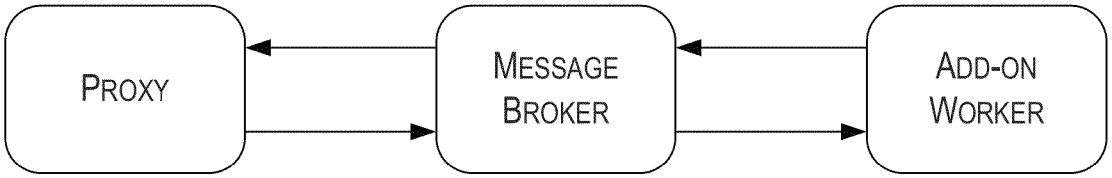
FIG. 7 depicts an example illustrating code representing an add-on that is configured to be loaded at run time for use in a social cloud-based hub.
FIG. 8 depicts a block diagram illustrating an example programmable API proxy for use with a message broker and one or more add-on workers in a social cloud-based hub.

FIG. 7 depicts an example illustrating an add-on configured to be loaded at run time. The example add-on of FIG. 7 is written in JavaScript and executed by node.js (http://node-js.org/), that defines two functions executed when the "onStart" and "onClose" event are triggered by the proxy. The proxy has the task of loading and executing the add-on.

Depending on the scenario, the proxy can load and invoke add-ons in a variety of ways. For example, the add-on can be bundled with the proxy, loaded or invoked at runtime, and/or the add-on can be a separate application (also called a "worker") that is executed when certain conditions are met. When the add-on is loaded or invoked at runtime, the add-on can be loaded from a file and/or the source code of the add-on can be download from a third-party server and stored in a file and/or executed in memory. When the add-on is a separate "worker" application that is executed when certain conditions are met, the add-on can be a server that listens on a port and is invoked by the proxy, and/or an application that processes a message queue that is populated by the proxy.

The add-on is typically bundled with the proxy or loaded or invoked at runtime when the proxy is run on high CPU machines and when requirements exist to reduce the complexity of the infrastructure. The add-on can be a separate "worker" application when a requirement exists to have separate machines to better scale the whole architecture.

FIG. 8 depicts a block diagram illustrating an example programmable API proxy for use with a message broker and one or more add-on workers in a social cloud-based hub, according to an embodiment. More specifically, FIG. 8 illustrates an example standalone add-on. In the example of FIG. 8, the proxy, rather than triggering events that are executed by a piece of code loaded at run-time, pushes or otherwise sends a message to a message broker. The message broker notifies the add-on workers. The add-on workers process the messages asynchronously and execute the desired action(s).

The architecture illustrated with respect to FIG. 8 is highly scalable. For example, when a plurality of requests are received by the proxy, the system administrator can simply add an unlimited number of "workers" to scale up the system. The "workers" can be in-memory processes or separate servers, and the message broker can be installed in the proxy to avoid having another separate process, or server, running.

User Interface Examples

The user interfaces of FIGS. 9-20 are generally self-explanatory based on the above detailed description, but some details will now be provided. The user interfaces of FIGS. 9-20 are generally discussed with respect to a social API hub for facilitating distribution of APIs.

Figure 9:
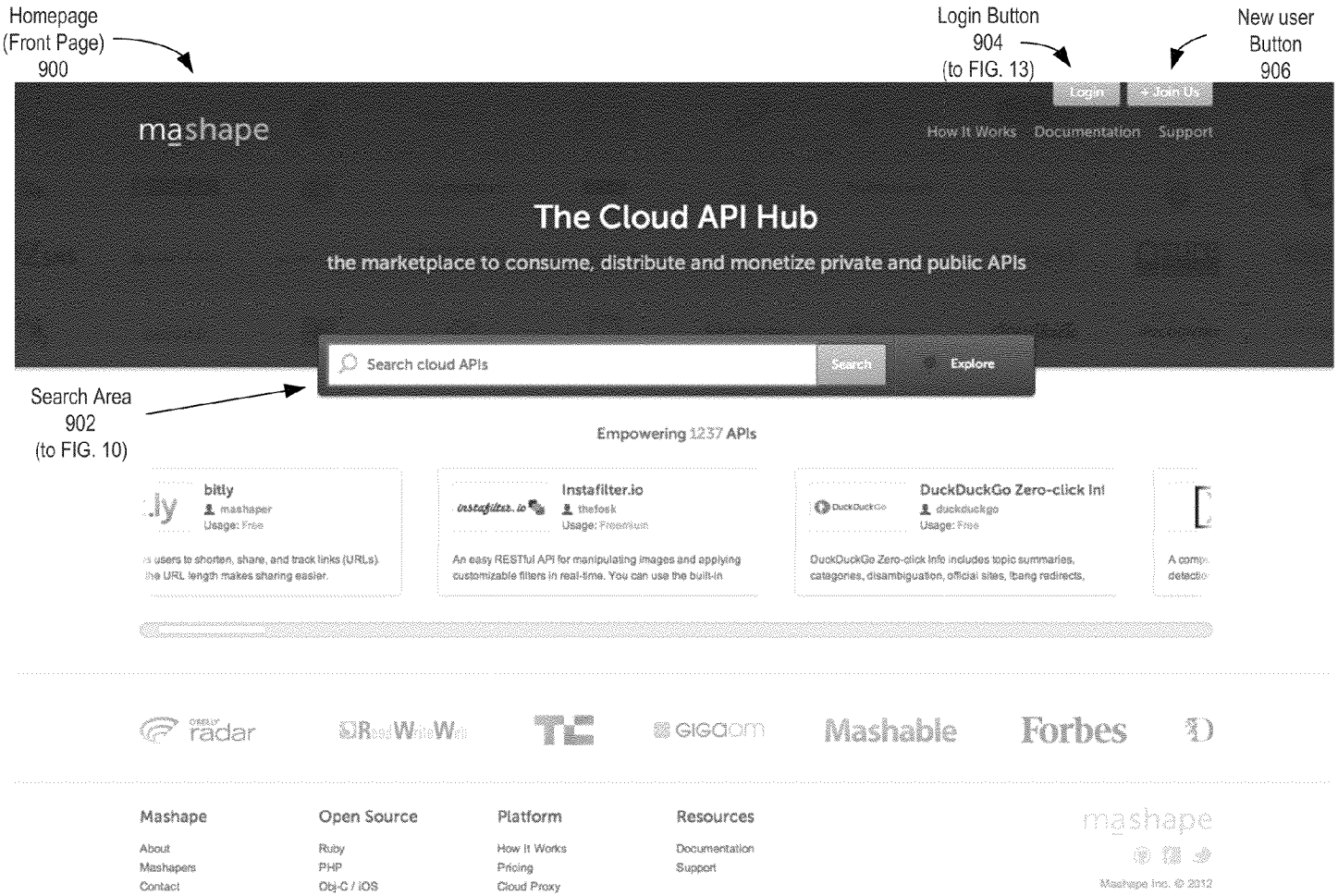
FIG. 9 illustrates an example user interface depicting a homepage or front page of a social cloud-based hub.

Referring first to FIG. 9 which depicts an example interface 900, according to an embodiment. More specifically, example interface 900 depicts a management (or hub) server front page or homepage. The example interface 900 includes a search area or search bar 902, which is provided to potential API consumers, a login button 904, and a new user button 906. The search area 902 allows potential API consumers searching for specific APIs to enter text-based queries that can indicate a type of API that the user is searching for, specific functionality associated with an API the user is searching for, and/or the name of an API that the user is searching for. The user is then provided with search results, such as those shown in FIG. 10, after selecting the "search" button. As discussed above, in one embodiment, the management (hub) server searches the API data store to identify those APIs that match the search criteria. The example interface 900 also includes various other buttons for documentation, support, etc.

Figure 10:
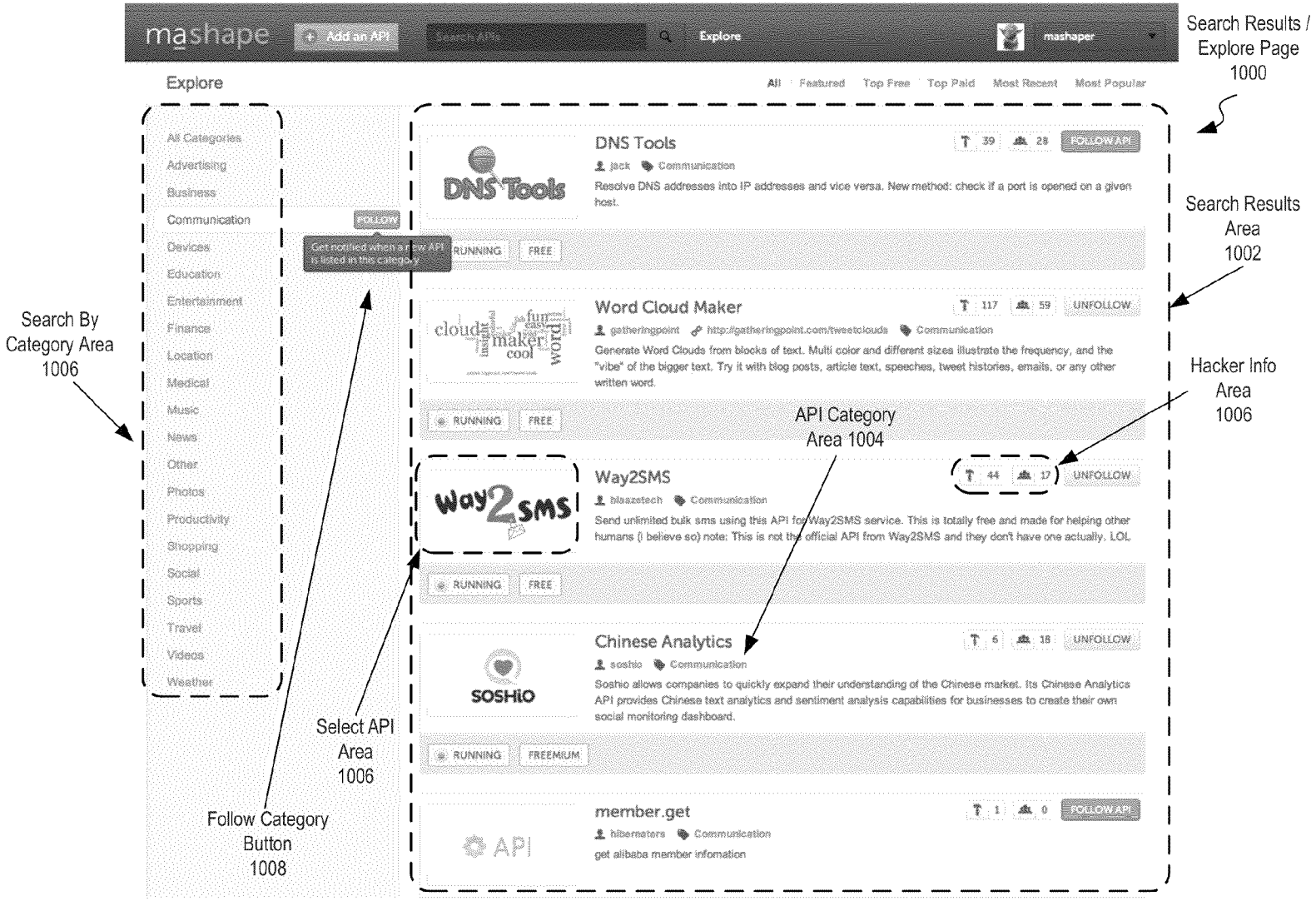
FIG. 10 illustrates an example user interface depicting API search results in a social cloud-based hub.

FIG. 10 depicts an example search results interface 1000, according to an embodiment. In the example of FIG. 10, a potential API consumer has searched for APIs by entering a text-based search string into the search bar. The example interface 1000 includes a search results area 1002 and a search by category area 1006. The search by category area includes various categories that a user can browse or follow. Users can follow a category by selecting the follow category button 1008 that is associated with a particular category.

The search results area 1002 indicates various APIs that match the search criteria (e.g., the text-based search string). Each of the APIs that match the search criteria can include an associated API category in an API category area 1004 and a hacker information area 1006, among other information, displayed. The hacker information area 1006 provides social benefit as a potential API consumer can see which hacker (i.e., developers and/or users) hacks on, and/or makes modifications to, that API. More hackers can indicate a better API that is less prone to bugs and more likely to be quickly updated. As discussed above, hackers can, in some embodiments, update, modify, and/or otherwise edit APIs in some instances. Additionally, these hackers may leave useful comments and or interact with one another in order to speed up the development process and make it more enjoyable through social interaction.

Additionally, in the search results example interface 1000, the number of methods in the API can be illustrated in addition to brief descriptions, pricing information, follow API buttons, etc. Many APIs are free or freemium (i.e.,have free and paid aspects).

FIGS. 11A-C illustrate an example user interface 1100 depicting an API profile page for use in a social cloud-based hub, according to an embodiment. An API profile interface may be presented if, for example, an API has been selected from the search results in order to show more detailed information about the selected API.

The API profile page 1100 includes an API documentation tab 1102, an API pricing tab 1104, a more add-ons tab 1108, and a report issue button 1106. In this example, the more add-ons tab 1108 illustrates a tab that can represent one or more additional add-ons. It is appreciated that there may be another tab for each additional add-on. As shown, the API documentation tab 1102 is selected causing the documentation pane 1120 to be displayed. The documentation pane 1120 illustrates various information about the selected API.

Additionally, the documentation pane 1120 includes an embedded API test area 1112. The embedded API test area 1112 is provided to allow a potential API consumer to test the API in the cloud-based system or hub prior to downloading and/or otherwise committing to the API. As discussed above, the management system provides the ability to test the API online or in the cloud-based environment without writing code. FIGS. 11B and 11C illustrate more detail about the embedded API test area 1112. For example, within the embedded API test area 1112, a response status pane can include a response body test tab 1114 and a response headers tab 1116. Other tabs (not shown) are also possible.

Figure 12:
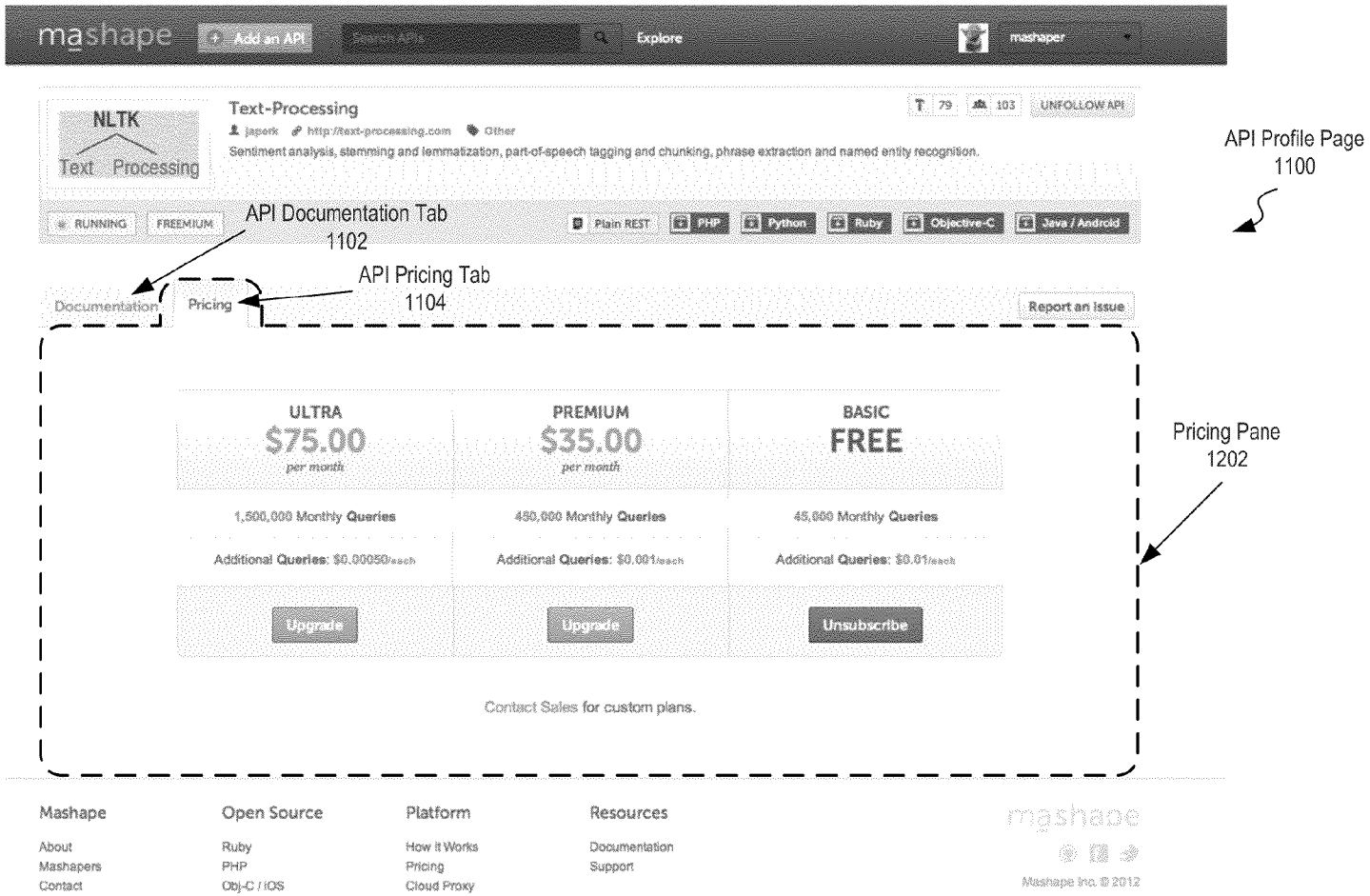
FIG. 12 illustrates an example user interface depicting an API profile page for use in a social cloud-based hub.

FIG. 12 illustrates an example user interface depicting the API profile page 1100 for use in a social cloud-based hub when the API pricing tab 1104 is selected. More specifically, when the API pricing tab 1104 is selected, the pricing pane 1202 is illustrated. The pricing pane 1202 illustrates various pricing information for the particular API. As discussed, many APIs are free or freemium (i.e., have free and paid aspects); however, others require payment (e.g., based on yearly, monthly, weekly, query access).

From the API profile page 1100, a user can select to download an API for integration into an application. The selected API can be downloaded (for later consumption) via a variety of auto-generated client libraries such as, for example, Bash, Ruby, Python, PHP, Node.js, C#, Java, and Objective-C. Additionally, information related to the privacy of the API, whether the API is running, the reliability of the API, the cost of the API, and the rate of the API can also displayed.

Figure 13:
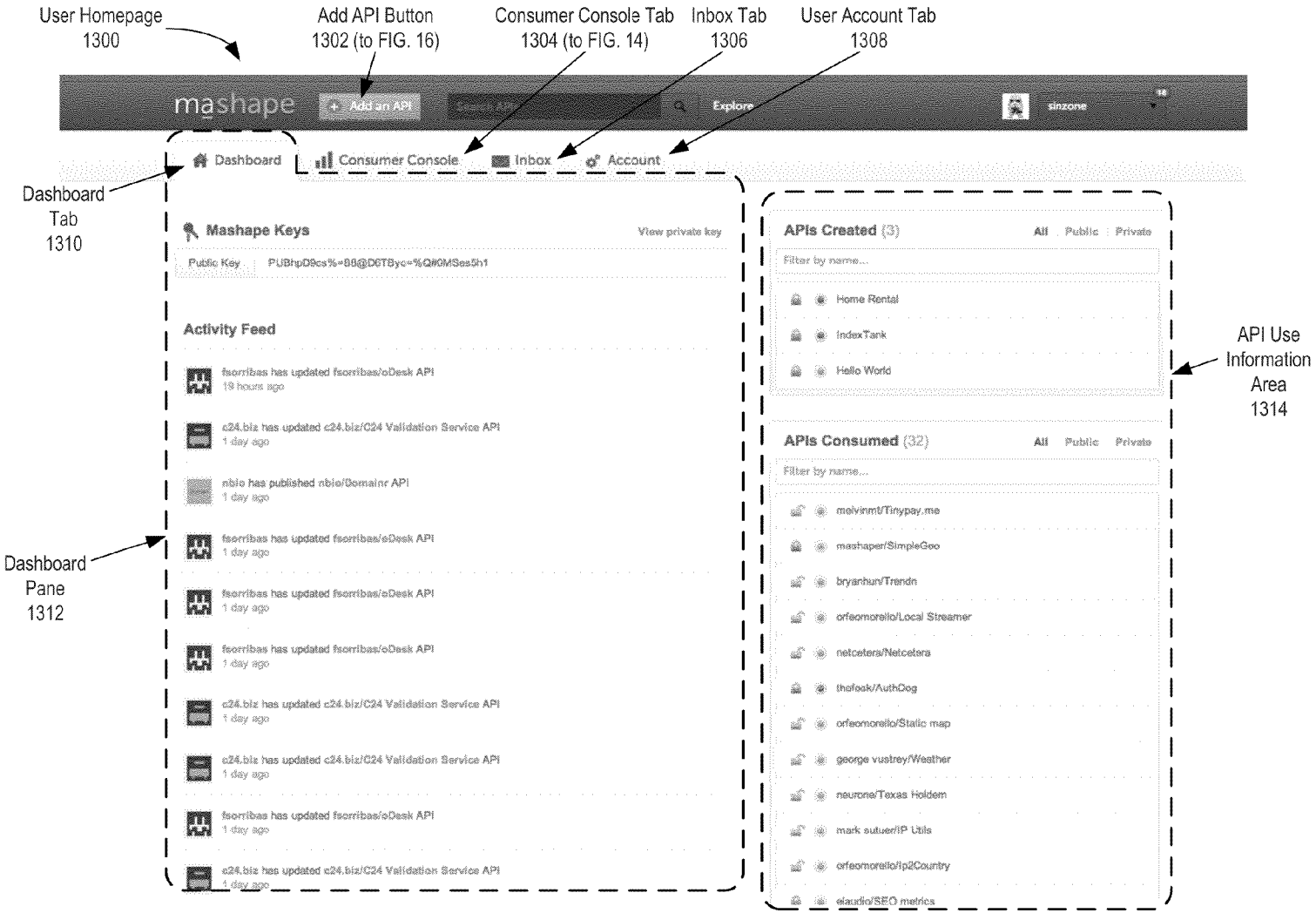
FIG. 13 illustrates an example user interface depicting a user homepage for use in a social cloud-based hub.

FIG. 13 illustrates an example user interface 1300 depicting a user homepage for use in a social cloud-based hub, according to an embodiment. As shown, the user homepage 1300 includes an add API button 1302. When selected, the API button 1302 allows a user to add an API for distribution in the huh. The user homepage 1300 also includes a dashboard tab 1310, a consumer console tab 1304, an inbox tab 1306, and a user account tab 1308. As shown, the dashboard tab 1310 is selected such that a dashboard pane 1312 is illustrated. The dashboard pane 1312 shows activities related to APIs the user is following, APIs the user has created, APIs the user has consumed, etc. Activities can include any event related to an API such as, for example, publishing an API or updating an API. The user homepage also includes an API use information area 1314 that illustrates information related to use of APIs by the user such as, for example, APIs created and APIs consumed.

Figure 14:
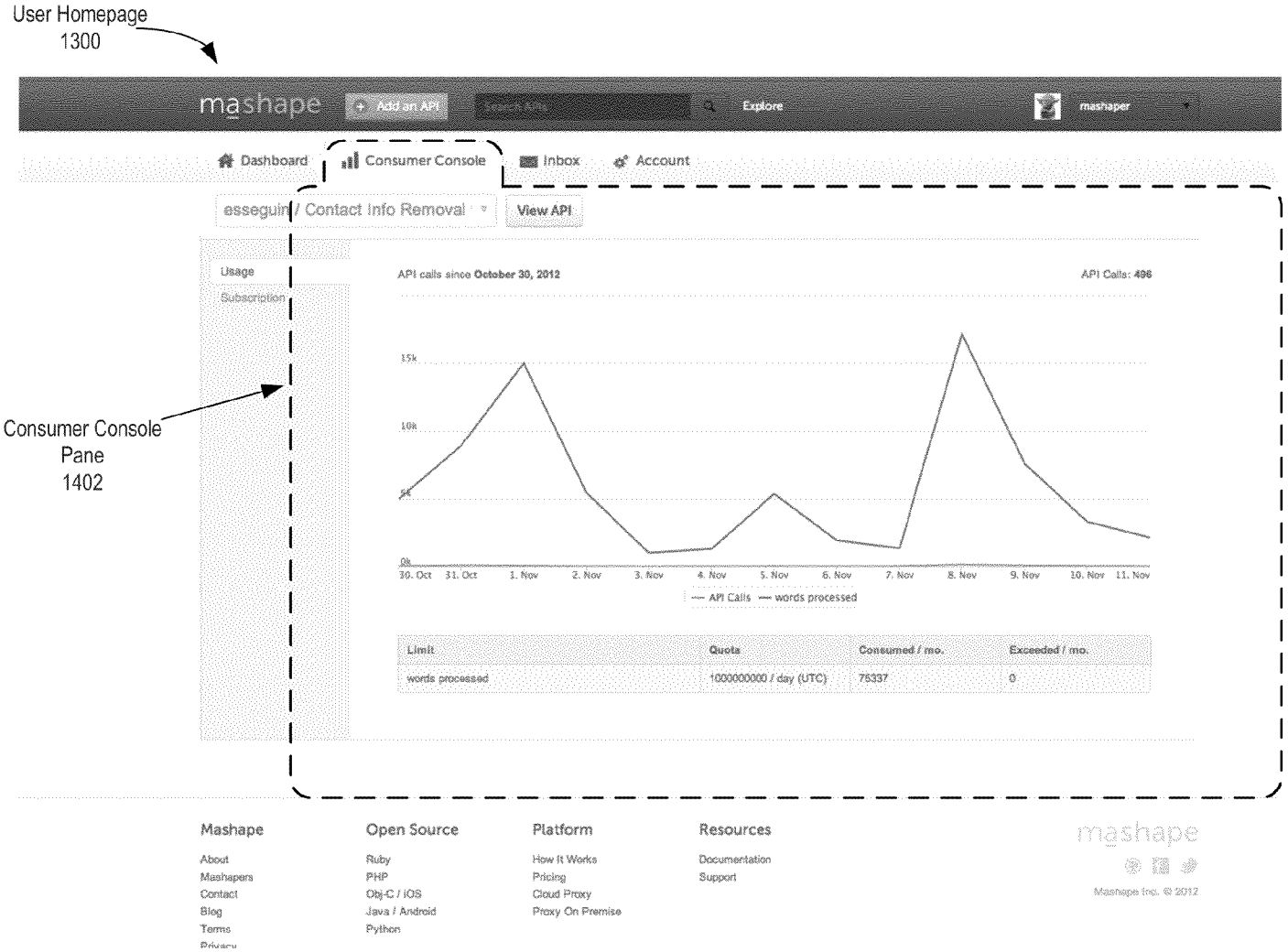
FIG. 14 illustrates an example user interface depicting a user homepage for use in a social cloud-based hub.

FIG. 14 illustrates an example of user homepage 1300 where the consumer console tab is selected such that the consumer console pane 1402 is displayed. The consumer console pane 1402 can graphically illustrate various statistics related to APIs associated with the user. This can include usage and subscription statistics (as shown).

FIG. 15 illustrates an example user interface depicting a user homepage (or profile page) 1500 for use in a social cloud-based hub. In addition to other information, API information related to the user, API activity associated with the user, etc. can be displayed.

Figure 16:
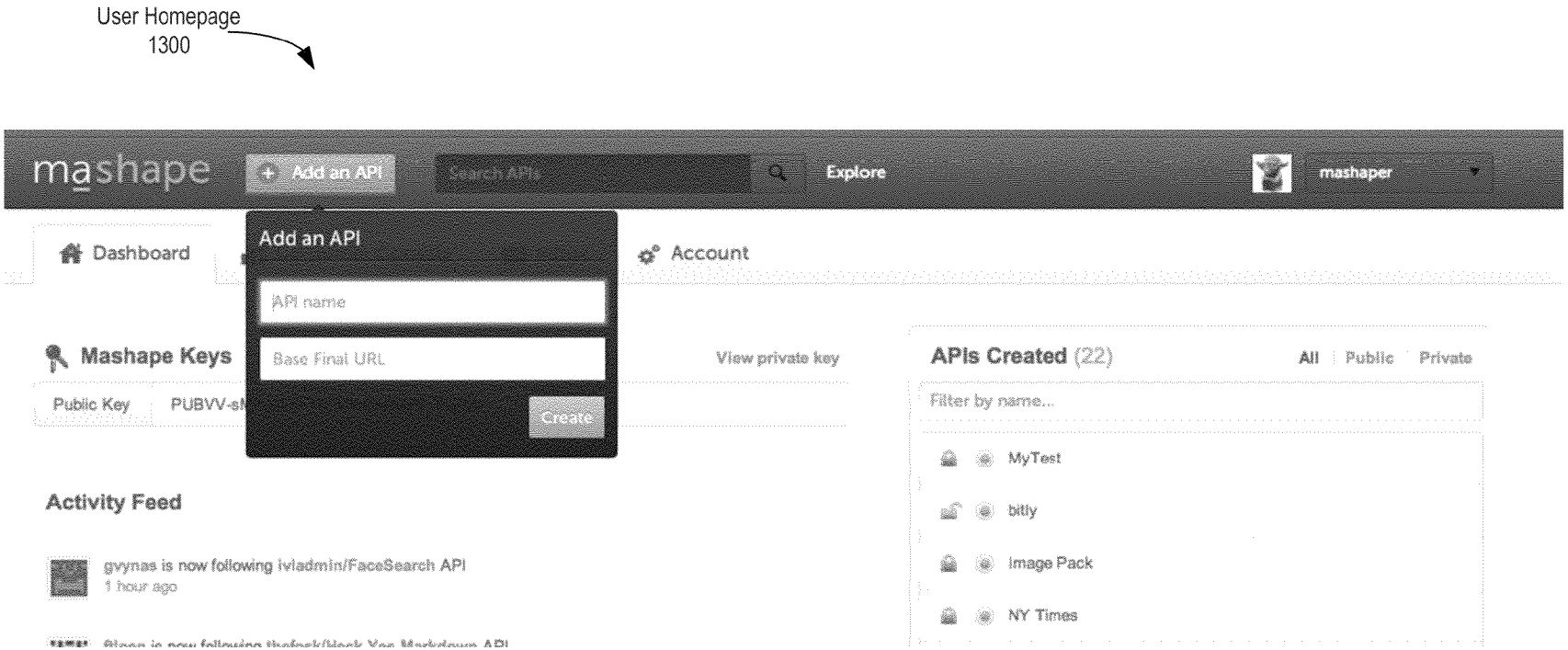
FIG. 16 illustrates an example user interface depicting a user homepage for use in a social cloud-based hub.

FIG. 16 illustrates an example of user homepage 1300 wherein the add API button 1302 is selected. It is appreciated that various user interface pages include an add API button and the example of FIG. 16 is representative of any of those pages.

Figure 17:
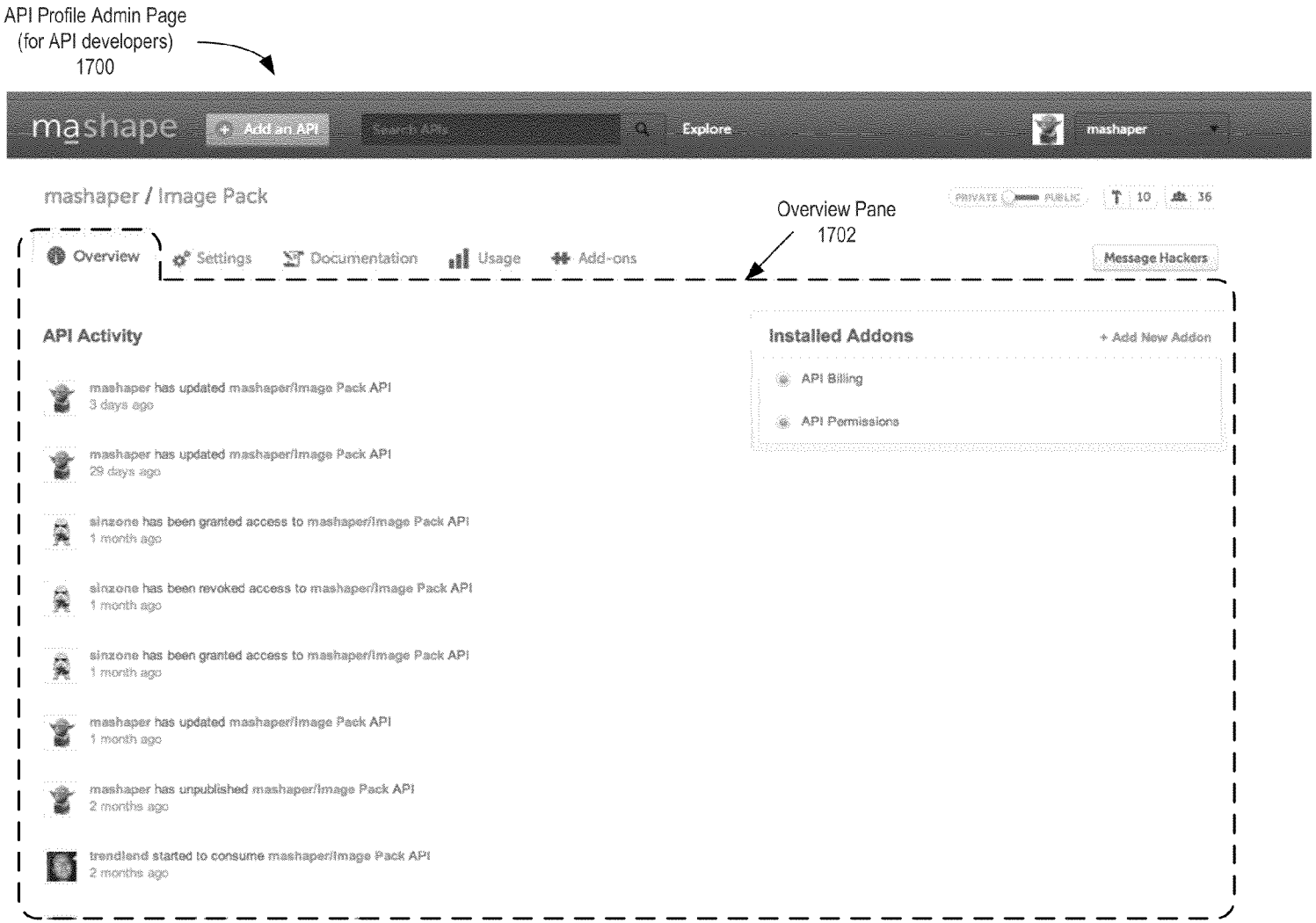
FIG. 17 illustrates an example user interface depicting an API profile administrator page for use in a social cloud-based hub.

FIGS. 17-20 illustrate an example user interface depicting an API profile administrator page 1700 for use in a social cloud-based hub, according to an embodiment. As shown in FIG. 17, an overview tab is selected such that an overview pane 1702 is displayed. Among other indicators, the overview pane 1702 can illustrate API activity and add-ons related to a specific API. In this example, information related to the API "Image Pack" is shown to the administrator (i.e., the API developer) of the "Image Pack" API.

Figure 18:
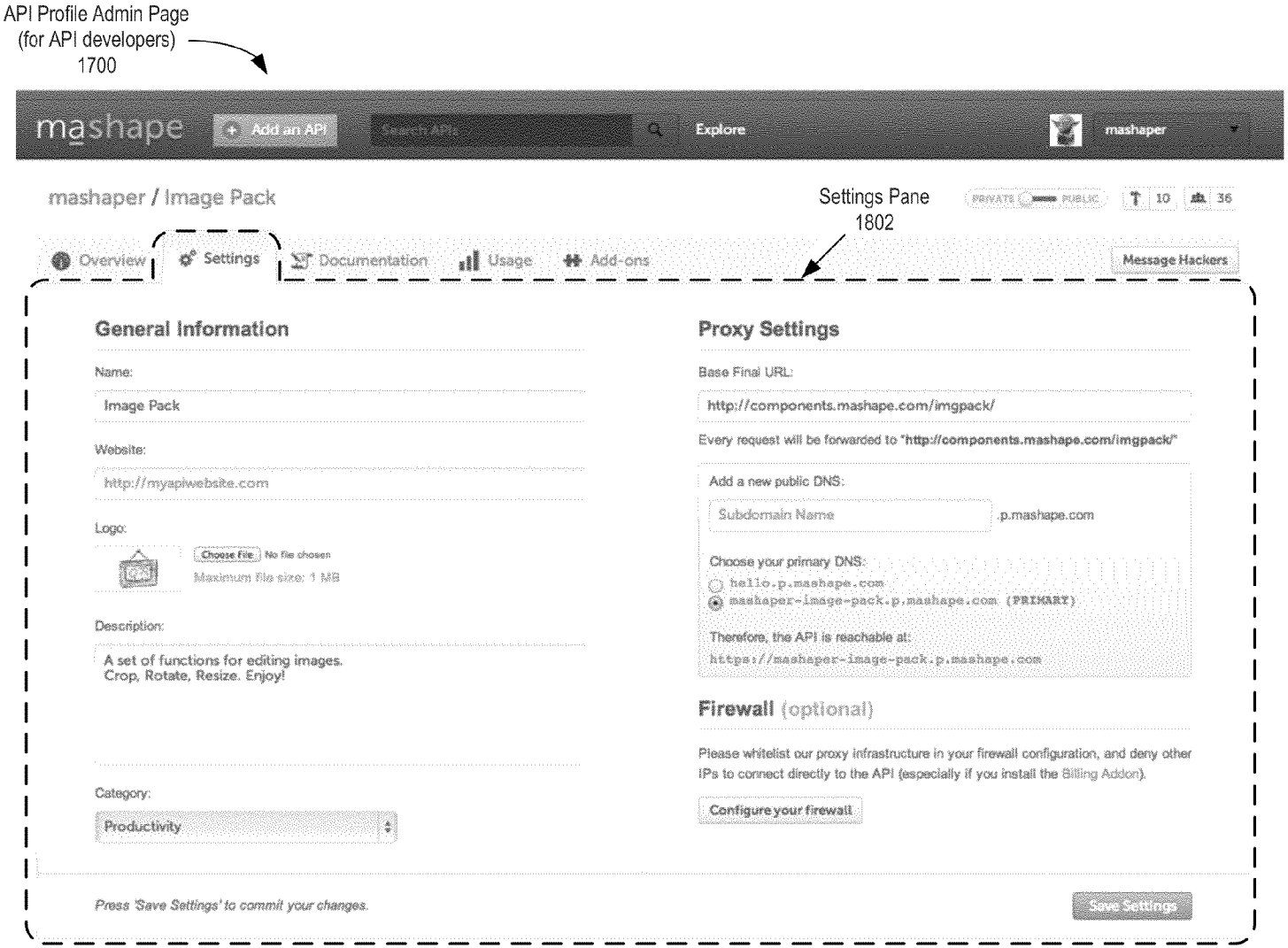
FIG. 18 illustrates an example user interface depicting an API profile administrator page for use in a social cloud-based hub.

FIG. 18 illustrates the API profile administrator page 1700 with the settings tab selected such that a settings pane 1802 is displayed. Among other information, the settings pane 1802 can illustrate generation information, proxy settings, firewall information, etc.

Figure 19:
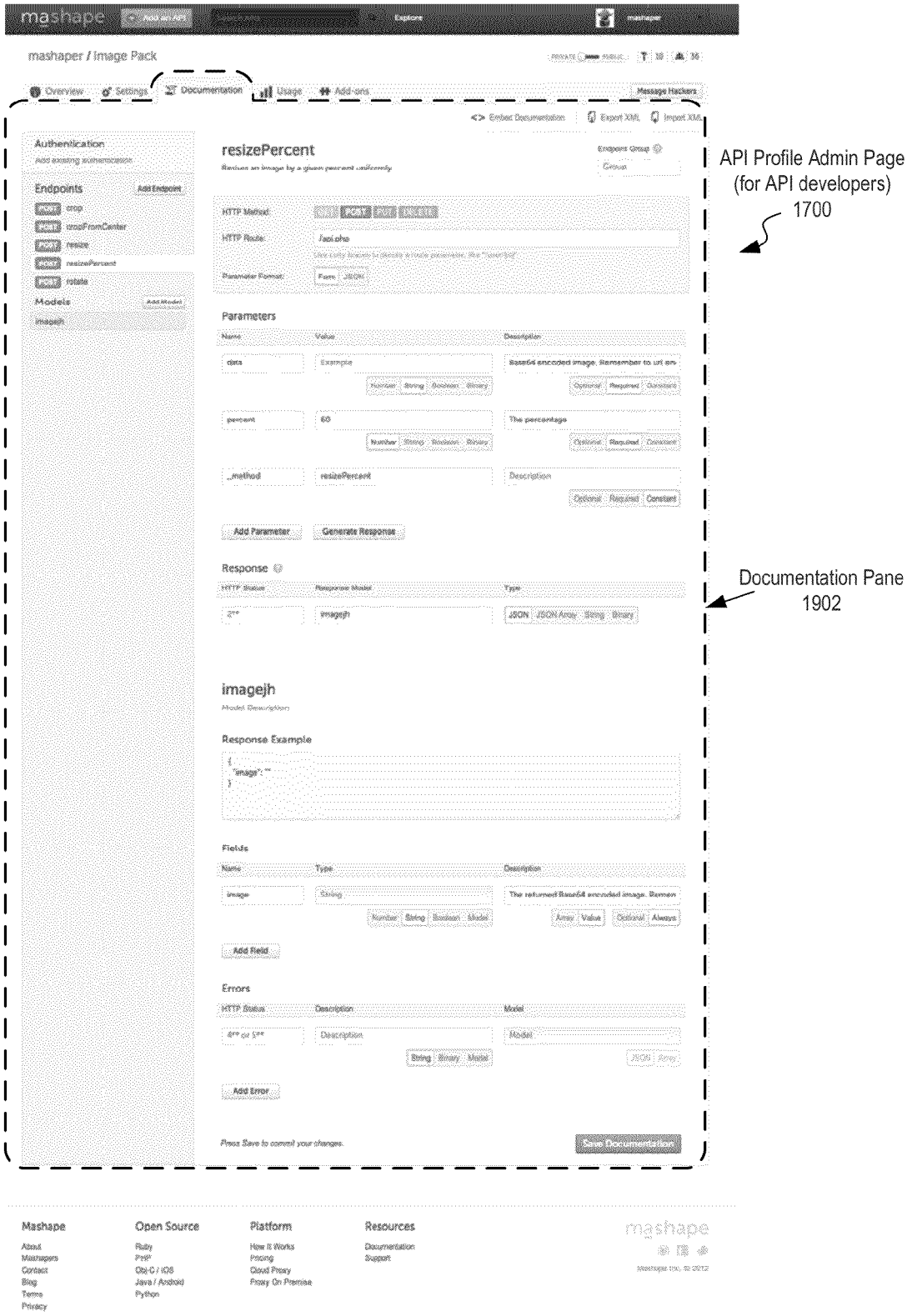
FIG. 19 illustrates an example user interface depicting an API profile administrator page for use in a social cloud-based hub.

FIG. 19 illustrates the API profile administrator page 1700 with the documentation tab selected such that a documentation pane 1902 is displayed. The documentation pane 1902 includes various information related to the API. An API developer can add and/or modify this information, which is displayed to API consumers, at any time.

Figure 20:
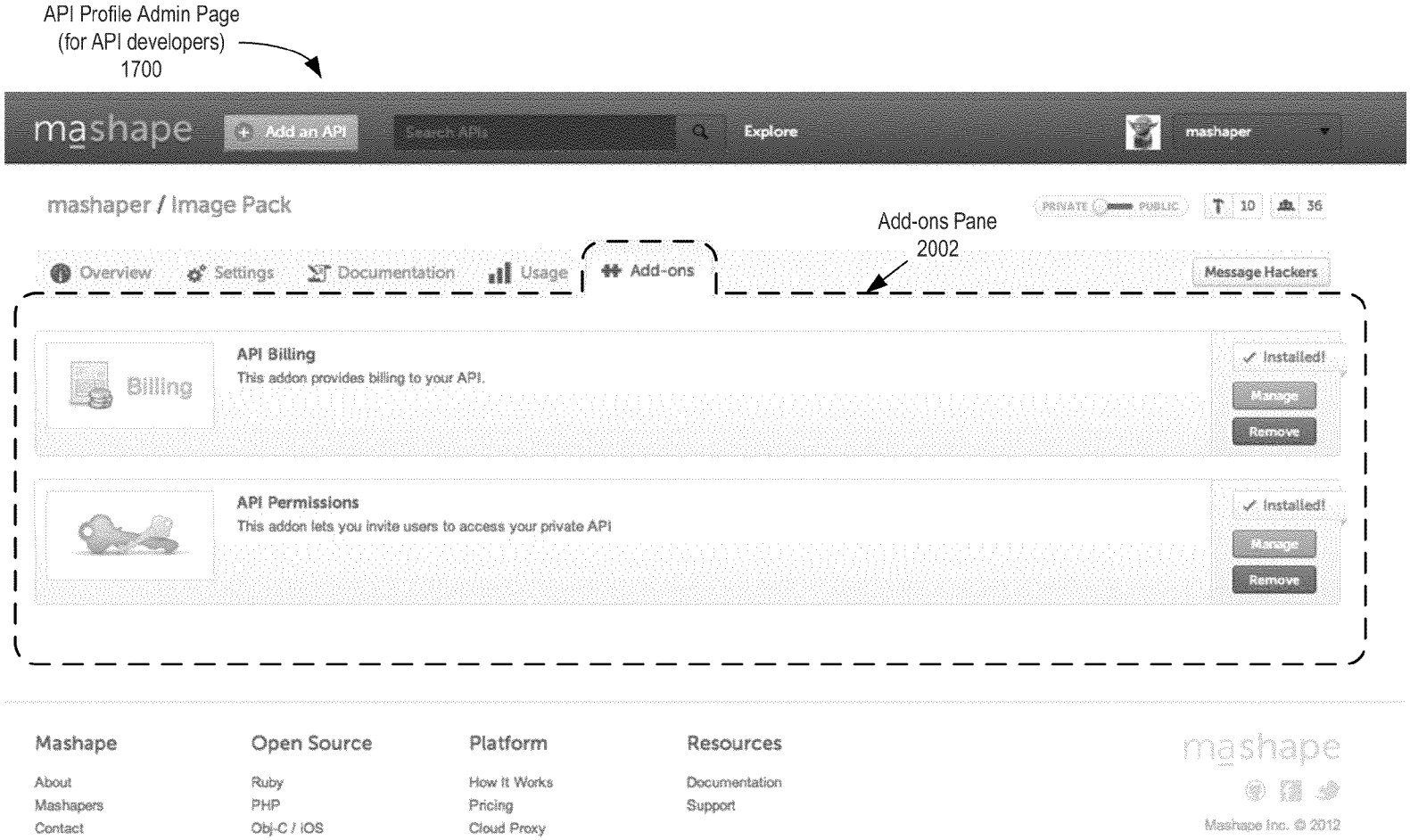
FIG. 20 illustrates an example user interface depicting an API profile administrator page for use in a social cloud-based hub.

FIG. 20 illustrates the API profile administrator page 1700 with the add-ons tab selected such that an adds-ons pane 2002 is displayed. The add-ons pane 2002 displays information related to the add-ons installed on top of the API. Among other information the add-ons pane 2002 can illustrate API billing information, API permission information, etc.

Figure 21:
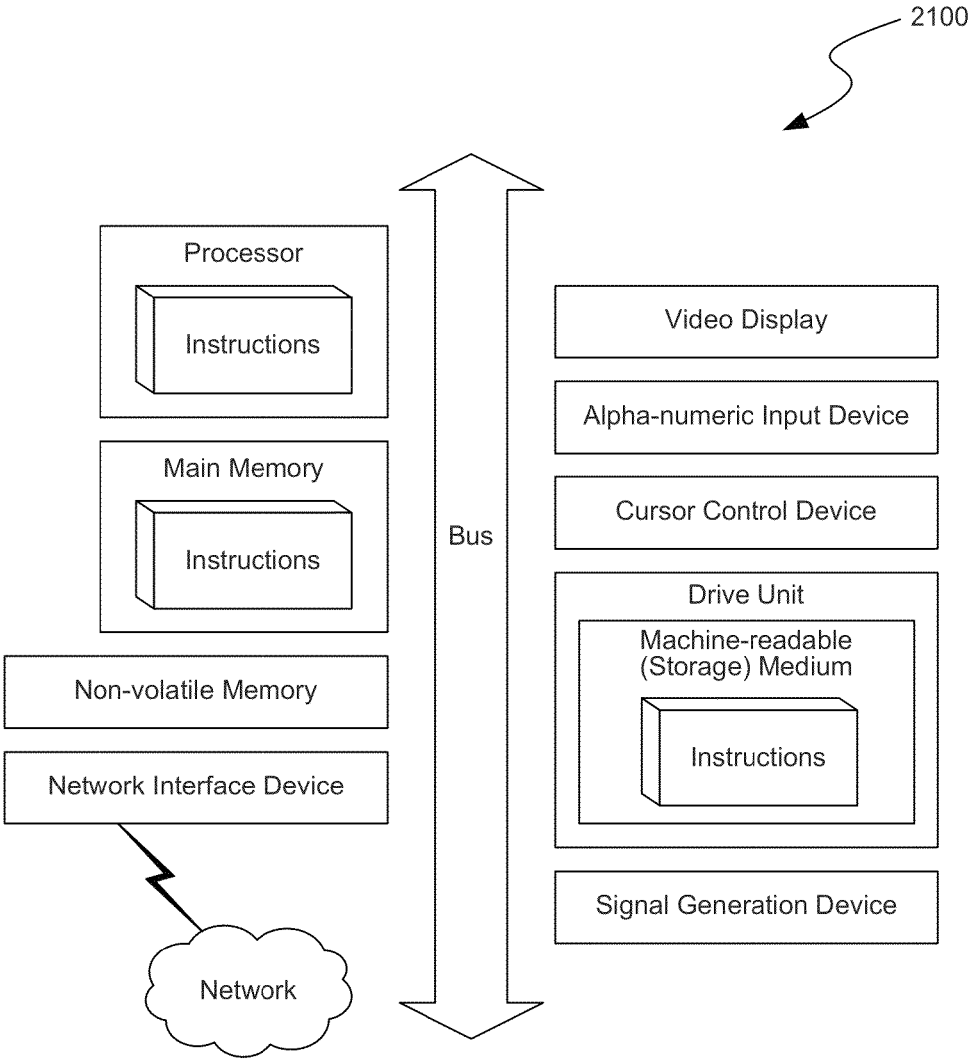
FIG. 21 depicts a diagrammatic representation of a machine in the example form of a computer system within which a set of instructions, for causing the machine to perform any one or more of the methodologies discussed herein, may be executed.

FIG. 21 shows a diagrammatic representation of a machine in the example form of a computer system 2100, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

What is claimed is:

1. A method comprising:

receiving, at a management system, user-generated parameters describing functionality associated with an application program interface (API);

configuring, at the management system, a proxy for providing secure communications between an API server and a client;

generating, at the management system, a plurality of client libraries based on the user-generated parameters, wherein the client libraries are utilized by users of the management system to consume the API, and wherein generating the plurality of client libraries includes bringing the client libraries into existence;

providing, at the management system, a plurality of add-ons to the client, wherein each add-on of the plurality of add-ons provides functionality in addition to the API;

receiving, at the management system, an indication of a selection of an add-on of the plurality of add-ons;

associating, at the management system, the add-on of the plurality of add-ons with the API to provide functionality in addition to the API;

receiving, at the management system, a request to publish the API; [and]

publishing, at the management system, the API via an online platform

*receiving, at the management system, a request to test the API within the online platform; and*

*responsive to the request, testing the API within the online platform.*

2. The method of claim 1, wherein the API returns JavaScript Object Notation (JSON) data.

3. The method of claim 1, further comprising:

receiving, at the management system, a request from one of the plurality of users of the management system to consume the API.

4. The method of claim 1, wherein the online platform comprises an API hub.

5. The method of claim 1, further comprising:

automatically categorizing, at the management system, the API based on the user-generated parameters; and storing the API in an API data store.

6. The method of claim 1, further comprising:

after publishing the API via the online platform, providing, at the management system, a custom uniform resource locator (URL) for the API, wherein the URL is configured for user registration and authentication.

7. The method of claim 1, further comprising:

generating, at the management system, customized documentation based on the user-generated parameters.

8. The method of claim 1, wherein an add-on of the plurality of add-ons comprises an add-on including billing system functionality.

9. The method of claim 1, wherein an add-on of the plurality of add-ons comprises an add-on for user authentication.

10. The method of claim 1, wherein an add-on of the plurality of add-ons comprises an add-on for analytics associated with the use of the API.

11. The method of claim 1, wherein an add-on of the plurality of add-ons comprises an add-on for a request limit check to the API, the request limit check indicating the number of requests allowed per a specified time period.

12. The method of claim 1, wherein configuring the proxy comprises configuring one or more fields in the online platform.

[13. The method of claim 1, further comprising:

receiving, at the management system, a request to test the API within the online platform; and responsive to the request, testing the API within the online platform.]

14. The method of claim 1, wherein the parameters are received via an XML description file.

15. The method of claim 1, further comprising:

receiving, at the management system, one or more contributions to the API from a third-party developer, wherein the third-party developer is different than an original developer of the API; and publishing, at the management system, the updated API.

16. The method of claim 1, wherein publishing the API via the online platform comprises:

providing, at the management system, a number of third-party developers that consume and contribute to the development of the API.

17. A method comprising:

receiving, at a management system, a text-based search query indicating API specific search criteria;

searching, at the management system, a categorized API data store using the API specific search criteria;

providing, at the management system, one or more APIs that match the API specific search criteria via an online platform;

providing, at the management system, a plurality of add-ons, wherein each add-on of the plurality of add-ons provides functionality in addition to the API;

responsive to providing the one or more APIs, receiving, at the management system, a selection of a first API of the one or more APIs that match the API specific search criteria;

responsive to providing the plurality of add-ons, receiving, at the management system, an indication of a selection of an add-on of the plurality of add-ons;

associating, at the management system, the add-on of the plurality of add-ons with the first API to provide functionality in addition to the first API;

responsive to receiving the selection of the first API, providing, at the management system, a plurality of automatically generated client libraries associated with the first API;

receiving, at the management system, a selection of a first client library of a plurality automatically generated client libraries associated with the first API;

determining, at the management system, whether an API consumer has indicated to test the first API;

testing the first API at the management system in response the determination of whether the API consumer has indicated to test the first API; and providing, at the management system, the first API via the online platform.

18. The method of claim 17, wherein providing the first API comprises:

providing the first automatically generated client library associated with the first API.

19. The method of claim 17, wherein the text-based search inquiry indicates a type of an API, functionality of an API, or an API name.

20. The method of claim 17, further comprising:

receiving, at the management system, a request to test the first API via a test console that is embedded in the online platform.

21. The method of claim 17, further comprising:

responsive to receiving the selection of the first API, providing, at the management system, automatically generated documentation associated with that API.

22. The method of claim 17, wherein providing the one or more APIs that match the text-based search inquiry via an online platform comprises:

providing categories associated with the one or more APIs; and providing an indication of the number of third-party developers that contribute to the development of the API.

23. The method of claim 22, further comprising:

providing the identities of the third-party developers that contribute to the development of the API.

24. The method of claim 22, further comprising:

providing a forum indicating comments from the third-party developers that contribute to the development of the API.

25. The method of claim 17, further comprising:

responsive to providing the first API via the online platform, updating, at the management system, third-party usage of the first API.

26. The method of claim 17, wherein said each library was automatically generated in a different one of the following programming languages: Bash, Ruby, Python, PHP, Node.js, C#, Java, or Objective-C.

27. A management system comprising:

a network interface configured to receive user-generated parameters describing functionality associated with an application program interface (API) and a request to publish the API; and a processing system configured to configure a proxy for providing secure communications between an API server and a client, automatically generate a plurality of client libraries based on the user-generated parameters, provide a plurality of add-ons, wherein each add-on of the plurality of add-ons provides functionality in addition to the API, receive an indication of a selection of an add-on of the plurality of add-ons, and associate the add-on of the plurality of add-ons with the API, wherein the client libraries are utilized by users of the management system to consume the API, [and]

wherein the processing system being configured to automatically generate the plurality of client libraries includes being configured to bring the client libraries into existence, and to publish the API via an online platform,

*receive a request to test the API within the online platform, and*

*wherein responsive to the request, test the API within the online platform.*

28. A management system comprising:

means for receiving a text-based search query indicating API specific search criteria;

means for searching a categorized API data store using the API specific search criteria;

means for providing one or more APIs that match the API specific search criteria via an online platform;

means for providing a plurality of add-ons, wherein each add-on of the plurality of add-ons provides [functionality in addition] *an additional function* to an API of the one or more APIs *when the add-on associated with a respective API*;

means for receiving a selection of a first API of the one or more APIs that match the API specific search criteria responsive to providing the one or more APIs;

means for receiving an indication of a selection of an add-on of the plurality of add-ons;

means for associating the add-on of the plurality of add-ons with the first API;

means for automatically generating a plurality of client libraries based on user-generated parameters associated with the first API, and based on a standard description format associated with the first API;

means for providing the plurality of client libraries associated with the first API responsive to receiving the selection of the first API;

means for receiving a selection of a first client library of the plurality of client libraries associated with the first API; and means for providing the first API via the online platform

*means for receiving a request to test the API within the online platform; and*

*responsive to the request, means for testing the API within the online platform.*

29. A method comprising:

receiving, at a management system, user-generated parameters including any of an applications programming interface (API) name, an API tag, an API version, an public/private setting for an API, a description of an API, or a description of a version of an API;

configuring, at the management system, a proxy for providing secure communications between an API server and a client to enable the client to securely consume the API;

generating, at the management system, a plurality of client libraries based on the user-generated parameters, wherein the client libraries are utilized by users of the management system to consume the API, and wherein generating the plurality of client libraries includes bringing the client libraries into existence;

providing, by the management system, a selection of a plurality of add-ons to the client, wherein each add-on of the plurality of add-ons provides additional functionality to the API;

receiving, at the management system and from the client, an indication of a selection of a particular add-on of the plurality of add-ons;

associating, at the management system, the particular add-on with the API to provide additional functionality to the API;

receiving, at the management system, a request to publish the API; [and]

publishing, at the management system, the API via an online platform[.],

*receiving, at the management system, a request to test the API within the online platform; and*

*responsive to the request, testing the API within the online platform.*

*30. A method comprising:*

*receiving, at a management system, user-generated parameters describing functionality associated with an application program interface (API);*

*configuring, at the management system, a proxy server configured to:*

*providing secure communications between an API server and a client;*

*receiving an HTTP request from a client;*

*executing a plurality of add-ons associated with the API, wherein the plurality of add-ons associated with the API are computer programmable code that extends functionalities of the proxy server;*

*forwarding the HTTP request to an API server that stores the API;*

*receiving, from the API, a response to the HTTP request; and*

*sending, the response to the HTTP request, to the client;*

*generating, at the management system, a plurality of client libraries based on the user-generated parameters, wherein the client libraries are utilized by users of the management system;*

*receiving, at the management system, an indication of a selection of an add-on of the plurality of add-ons;*

*associating, at the management system, the add-on of the plurality of add-ons with the API to provide functionality in addition to the API;*

*publishing, at the management system, the API via an online platform, wherein the online platform comprises an API hub;*

*receiving, at the management system, a request to test the API within the online platform; and*

*responsive to the request, testing the API within the online platform.*

*31. The method of claim 30, wherein the API returns JavaScript Object Notation (JSON) data.*

*32. The method of claim 30, further comprising:*

*receiving, at the management system, a request from one of the plurality of users of the management system to consume the API.*

*33. The method of claim 30, further comprising:*

*automatically categorizing, at the management system, the API based on the user-generated parameters; and*

*storing the API in an API data store.*

*34. The method of claim 30, further comprising:*

*after publishing the API via the online platform, providing, at the management system, a custom uniform resource locator (URL) for the API, wherein the URL is configured for user registration and authentication.*

*35. The method of claim 30, further comprising:*

*generating, at the management system, customized documentation based on the user-generated parameters.*

*36. The method of claim 30, wherein an add-on of the plurality of add-ons comprises an add-on including billing system functionality.*

*37. The method of claim 30, wherein an add-on of the plurality of add-ons comprises an add-on for user authentication.*

*38. The method of claim 30, wherein an add-on of the plurality of add-ons comprises an add-on for analytics associated with the use of the API.*

*39. The method of claim 30, wherein an add-on of the plurality of add-ons comprises an add-on for a request limit check to the API, the request limit check indicating the number of requests allowed per a specified time period.*

*40. The method of claim 30, wherein configuring the proxy comprises configuring one or more fields in the online platform.*

*41. The method of claim 30, wherein the parameters are received via an XML description file.*

*42. The method of claim 30, further comprising:*

*receiving, at the management system, one or more updates to the API from a third-party developer, wherein the third-party developer is different than an original developer of the API; and*

*publishing, at the management system, the updated API.*

*43. The method of claim 30, wherein publishing the API via the online platform comprises:*

*providing, at the management system, a number of third-party developers that consume and contribute to the development of the API.*

*44. The method of claim 30, wherein the plurality of client libraries include at least one of: Bash, Ruby, Python, PHP, Node.js, C#, Java, or Objective-C.*

*45. A method implemented at a proxy server for executing requests directed at an Application Programming Interface (API), the method comprising:*

*receiving an HTTP request from a client;*

*executing one or more installed add-ons associated with the API, wherein the one or more installed add-ons associated with the API are computer programmable code that extends functionalities of the proxy server;*

*forwarding the HTTP request to an API server that stores the API;*

*receiving, from the API, a response to the HTTP request; and*

*sending, the response to the HTTP request, to the client*

*receiving a request to publish the API;*

*publishing the API via an online platform, wherein the online platform comprises an API hub;*

*receiving a request to test the API within the online platform; and*

*responsive to the request, testing the API within the online platform.*

*46. The method of claim 45, wherein the one or more installed add-ons associated with the API are executed prior to forwarding the HTTP request to the API server.*

*47. The method of claim 45, wherein the one or more installed add-ons associated with the API are executed subsequent to forwarding the HTTP request to the API server.*

*48. The method of claim 45, wherein the one or more installed add-ons associated with the API are executed both prior and subsequent to forwarding the HTTP request to the API server.*

*49. The method of claim 45, wherein the proxy server is a programmable HTTP communicatively coupled to the client and the API server.*

*50. The method of claim 45, wherein the proxy server is a programmable HTTPS communicatively coupled to the client and the API server.*

*51. The method of claim 45, wherein the proxy server is located remotely to the API server.*

*52. The method of claim 45, wherein the proxy server is installed locally to an infrastructure associated with a provider of the API server.*

*53. The method of claim 46, wherein the one or more installed add-ons include an add-on for user authentication that validates the client for blocking unauthorized requests.*

*54. The method of claim 48, wherein the one or more installed add-ons include an add-on for providing billing system functionality, wherein the billing system functionality is configured to:*

*prior to forwarding the HTTP request to the API server:*

*determine whether the client is subscribed to a billing plan and*

*upon determining that the client is not subscribed to a billing plan, notify the client with an error message and terminate a network connection with the client.*

*55. The method of claim 48, wherein the one or more installed add-ons include an add-on for providing billing system functionality, wherein the billing system functionality is configured to:*

*subsequent to forwarding the HTTP request to the API server:*

*parsing the response to the HTTP request to determine a billing usage for the client.*

*56. The method of claim 45, wherein the one or more installed add-ons include an add-on for analytics associated with the use of the API.*

*57. The method of claim 45, wherein the one or more installed add-ons associated with the API are computer programmable code that extends functionalities of the proxy server by connecting the proxy with a third-party service.*

*58. The method of claim 45, wherein the one or more installed add-ons associated with the API are invoked at run time during the lifecycle of the API request.*

*59. The method of claim 45, wherein the one or more installed add-ons associated with the API is a separate application that is executed when one or more conditions are satisfied.*

*60. The method of claim 45, wherein the one or more installed add-ons associated with the API are included within the proxy server.*

*61. The method of claim 45, wherein the one or more installed add-ons associated with the API are computer programmable code that extends functionalities of the proxy server by formatting transformations from eXtensible Markup Language (XML) to JavaScript Object Notation (JSON).*

*62. The method of claim 58, wherein the one or more installed add-ons associated with the API are loaded from a file.*

*63. The method of claim 58, further comprising:*

*downloading, from a third-party server, the computer programmable code for the one or more installed add-ons associated with the API; and*

*executing the downloaded computer programmable code in memory.*

*64. The method of claim 59, wherein the one or more installed add-ons associated with the API is a server that listens at a port of the server, wherein the one or more installed add-ons associated with the API is invoked by the proxy server.*

*65. The method of claim 59, wherein the one or more installed add-ons associated with the API is used in an environment where separate servers in connection with separate applications are utilized for scalability.*

*66. The method of claim 59, wherein the separate application processes a message queue that is populated by the proxy server.*

*67. The method of claim 60, wherein the one or more installed add-ons associated with the API are included within the proxy server in an environment wherein the proxy server is run on computers with high CPU.*

*68. The method of claim 45, wherein the proxy server includes a message broker module, wherein the one or more installed add-ons associated with the API are standalone add-ons, further comprising:*

*sending a message to the message broker module, wherein the message broker module notifies the standalone add-ons of the message, wherein the standalone add-ons process the message asynchronously for executing one or more actions.*

*69. The method of claim 68, further comprising:*

*upon receiving additional HTTP requests, adding, by the proxy server, supplementary standalone add-ons, wherein the standalone add-ons are in-memory processes or separate servers.*

*70. A method of operating an application having a microservice architecture comprising:*

*receiving inbound API traffic associated with a plurality of APIs by a proxy server;*

*executing a set of common library functions by plugins installed on the proxy server, wherein the inbound API traffic is input to the set of common library functions; and*

*communicating, by the proxy server to the plurality of APIs, a first output of the set of common library functions by the plugins included with the inbound API traffic.*

*71. The method of claim 70, wherein the plurality of APIs are in a distributed architecture that jointly performs an application function.*

*72. The method of claim 70, wherein the set of common library functions include any of:*

*authentication;*

*user information identification;*

*analytics;*

*billing; or*

*any combination of the above.*

*73. The method of claim 70, further comprising:*

*receiving, by the proxy server, outbound API traffic from the plurality of APIs; and*

*communicating, by the proxy server to respective clients, the outbound API traffic.*

*74. The method of claim 73, further comprising:*

*executing the set of common library functions by plugins installed on the proxy server, wherein the outbound API traffic is input to the set of common library functions; and*

*wherein said communication of the outbound API traffic further includes a second output of the set of common*

*library functions by the plugins, the second output based on the outbound API traffic as input.*

*75. The method of claim 70, wherein the proxy server is architecturally positioned on a gateway node topologically in front of the plurality of APIs, wherein traffic to and from the plurality of APIs is routed through the gateway node.*

*76. The method of claim 70, wherein the inbound API traffic is a set of client requests.*

*77. The method of claim 70, wherein execution of the set of common library functions at the proxy server reduces the complexity of the infrastructure of the plurality of APIs by scaling the proxy server instead of the plurality of APIs.*

* * * * *